US011398990B1

(12) United States Patent
Cabrera et al.

(10) Patent No.: US 11,398,990 B1
(45) Date of Patent: Jul. 26, 2022

(54) DETECTING AND DIAGNOSING ANOMALIES IN UTILIZATION LEVELS OF NETWORK-BASED RESOURCES

(71) Applicant: Amazon Technologies, Inc., Seattle, WA (US)

(72) Inventors: Juan Jose Cabrera, Seattle, WA (US); Rachel Shaerrie Ford, Seattle, WA (US); Matthieu Benoit Humeau, Brooklyn, NY (US); Li Shao, Seattle, WA (US); Jeremy Jon Ung, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 16/586,594

(22) Filed: Sep. 27, 2019

(51) Int. Cl.
*H04L 47/70* (2022.01)
*G06K 9/62* (2022.01)
*H04L 43/0817* (2022.01)

(52) U.S. Cl.
CPC .......... *H04L 47/822* (2013.01); *G06K 9/6269* (2013.01); *H04L 43/0817* (2013.01); *H04L 47/826* (2013.01)

(58) Field of Classification Search
None
See application file for complete search history.

(56) References Cited

U.S. PATENT DOCUMENTS

| | | | | |
|---|---|---|---|---|
| 9,015,536 B1* | 4/2015 | Ricken | ............... | G06F 11/0709 714/47.3 |
| 2006/0106743 A1* | 5/2006 | Horvitz | .................. | G06N 7/005 706/21 |
| 2018/0219759 A1* | 8/2018 | Brown | ..................... | H04L 67/18 |
| 2019/0182119 A1* | 6/2019 | Ratkovic | ............ | G06F 16/2379 |
| 2019/0196938 A1* | 6/2019 | Mathen | ............... | G06F 11/3476 |
| 2019/0221090 A1* | 7/2019 | Beiser | .................. | G06K 9/6274 |
| 2020/0005222 A1* | 1/2020 | Bittmann | ............... | G16H 40/20 |
| 2020/0192589 A1* | 6/2020 | Mehta | .................... | G06F 3/0608 |
| 2020/0228550 A1* | 7/2020 | Ravindranathan | ........................... | H04L 43/0817 |
| 2020/0250477 A1* | 8/2020 | Barthur | .................... | G06F 9/542 |
| 2020/0252461 A1* | 8/2020 | Xu | .......... | G16Y 40/20 |
| 2020/0265119 A1* | 8/2020 | Desai | ...................... | G05B 17/02 |
| 2020/0380117 A1* | 12/2020 | Marwah | ................ | G06F 21/552 |
| 2020/0382534 A1* | 12/2020 | Simanovsky | ....... | H04L 63/1408 |
| 2020/0389473 A1* | 12/2020 | Rondeau | ............. | H04L 63/1416 |
| 2021/0014102 A1* | 1/2021 | Singh | ................... | G06K 9/6223 |
| 2021/0026747 A1* | 1/2021 | Garion | ............... | G06F 11/3006 |
| 2021/0064432 A1* | 3/2021 | Benmakrelouf | ....... | G06N 3/086 |
| 2021/0109836 A1* | 4/2021 | Cranfill | ............... | G06F 11/3423 |

* cited by examiner

*Primary Examiner* — Ajit Patel
*Assistant Examiner* — Liem H. Nguyen
(74) *Attorney, Agent, or Firm* — Lee & Hayes, P.C.

(57) ABSTRACT

This disclosure describes systems, devices, and techniques for detecting and diagnosing anomalies in utilization levels of network-based resources. In an example method, at least one utilization level of one or more computer resources by an account during a time interval may be received. A possible anomaly can be detected if the at least one utilization level is determined to be outside of a predetermined range. The anomaly can be confirmed determining that at least a threshold number of multiple discrimination layers identify an anomaly in the at least one utilization level. An action can be performed in response to confirming the anomaly.

20 Claims, 13 Drawing Sheets

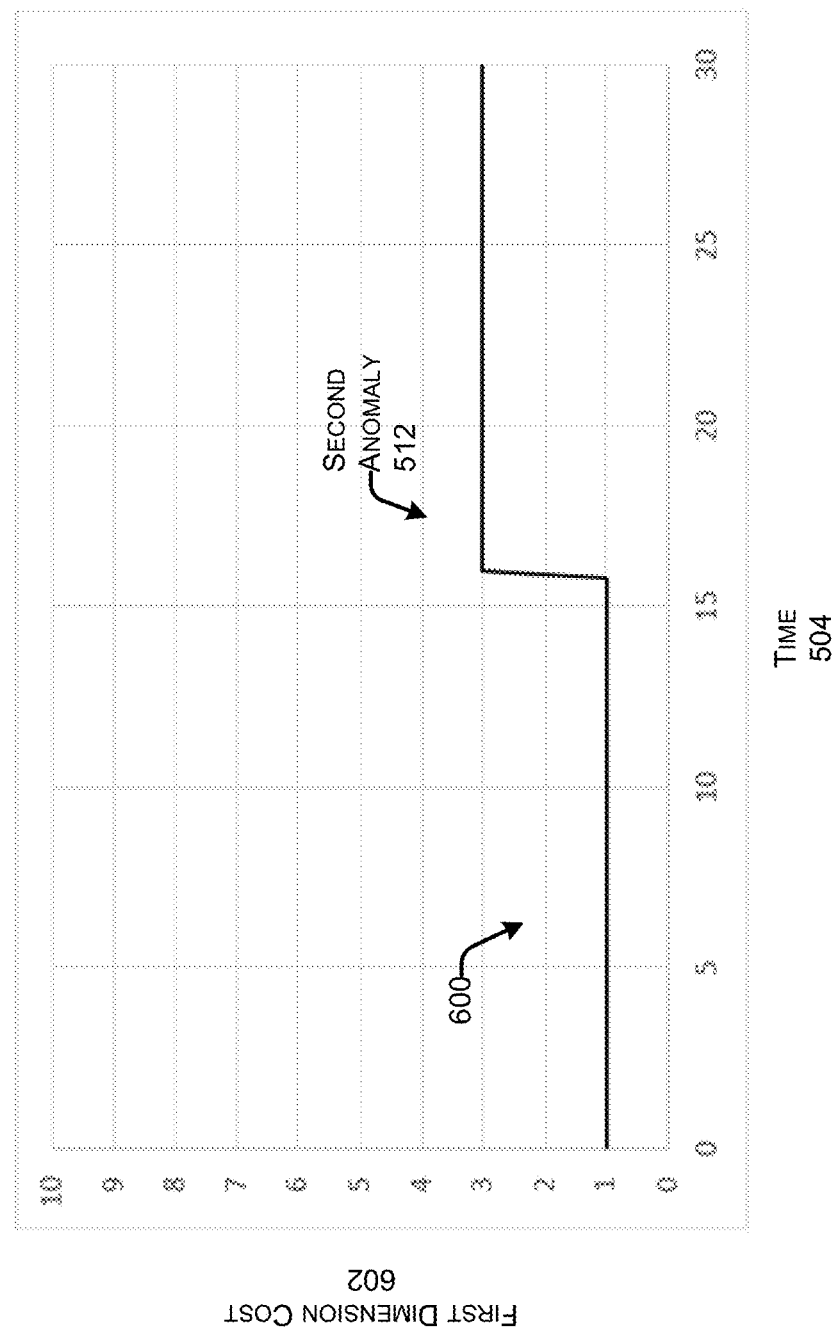

DETECTING AND DIAGNOSING ANOMALIES IN UTILIZATION LEVELS OF NETWORK-BASED RESOURCES

BACKGROUND

Network-based computing can enable users to selectively utilize various computer resources (e.g., memory, processing capability, or the like) upon request. In a network-based computing environment, a user may request resources hosted by various devices that are not actively managed by the user. For instance, the resources may be hosted by one or more remote devices that are owned and/or managed by a separate network-based service provider. By utilizing network-based computing resources, the user can minimize up-front computer infrastructure costs by selectively using an amount of resources requisite with the user's needs over time.

Providers of network-based computing services may charge users using a pay-as-you go model. For instance, a service provider may charge a user a fee based on how many resources the user has requested, the types of resources the user has requested, or the like. In some cases, service providers can provide a large variety of computer resources that may be associated with a variety of costs. It may be difficult for individual users to track their utilization of the various resources over time. Accordingly, users may be surprised by sudden costs associated with changes in their utilization patterns and/or changes in the resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates an example environment for detecting an anomaly based on utilization data of one or more accounts. The account(s) may be a single account, multiple accounts within the same account family, or the like.

FIGS. 6A to 6C illustrate example dimensional costs associated with the anomalous utilization data described above with reference to FIG. 5. The dimensional costs illustrated in FIG. 6A to 6C can be individually correlated to detected anomalies. The dimensions that are most closely correlated with the detected anomalies may be identified as root causes.

DETAILED DESCRIPTION

Figure 1:
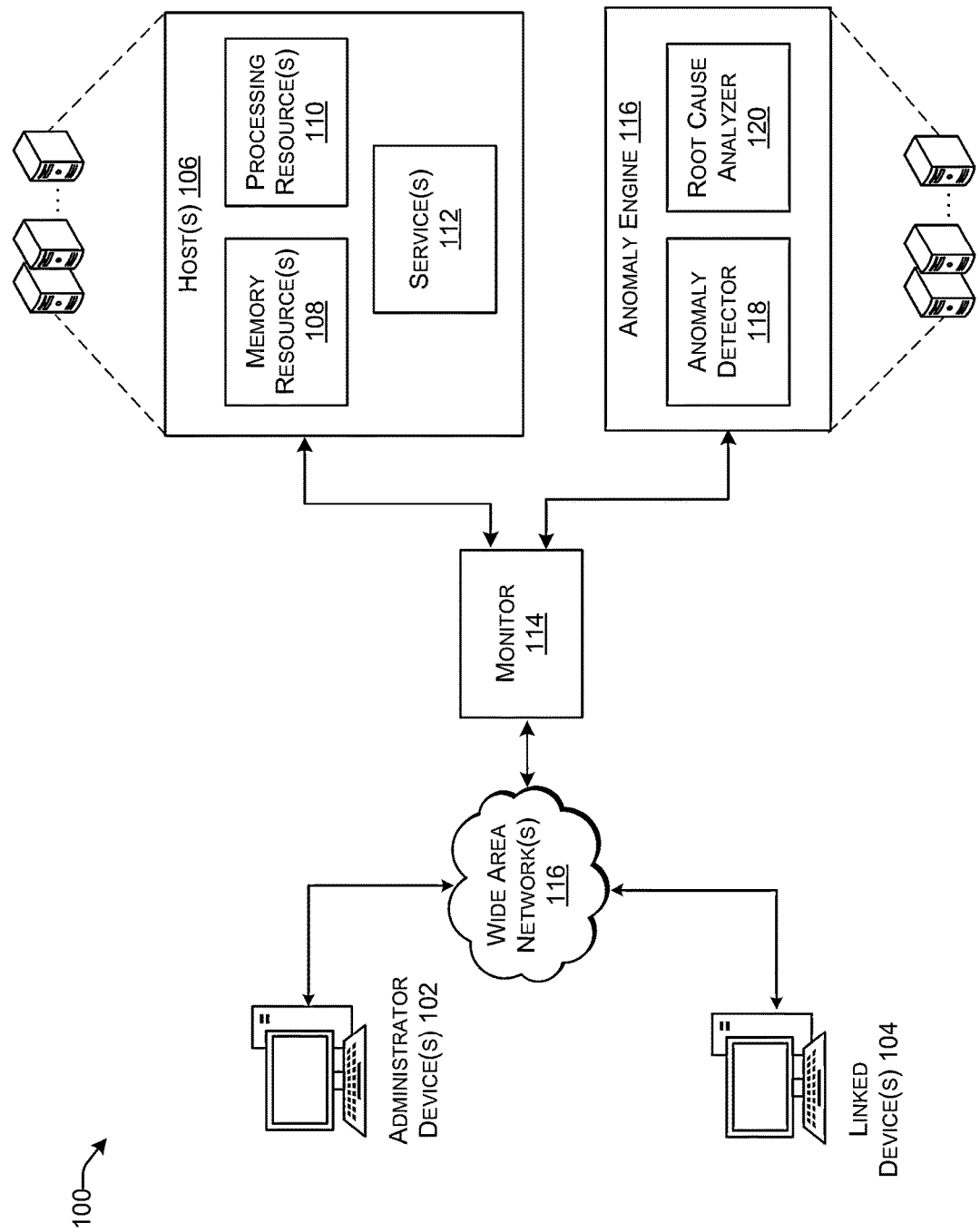
FIG. 1 illustrates an example environment for detecting and diagnosing anomalies in resource utilization by one or more accounts. An anomaly engine can report identified anomalies and/or root causes to various devices associated with the account(s).

This disclosure describes various techniques for detecting anomalies in a level of utilization, by an account, of one or more computing resources during a particular time interval. In example implementations, in which an anomaly is detected, various techniques disclosed herein can be used to diagnose one or more root causes of the detected anomaly.

In various examples of network-based computing, an account may flexibly utilize multiple types of remote computing resources. In various examples, a level of utilization of the computing resources may be adjusted substantially in real time according to requests from a device associated with the account.

One potential drawback of this flexibility is that utilization may be difficult to track in real-time. This drawback is further exacerbated when many different types of computing resources, with different costs, can be utilized simultaneously. If a bad actor requests utilization of a large amount of the computing resources on behalf of the account, an administrator of the account may be unable to identify the sudden increase in utilization. As a result, the high utilization may persist for an extended period of time. Such high utilization may expend or otherwise tie-up an unexpectedly large amount of computing resources and may prevent those resources from being utilized for other purposes. In addition, the high utilization may obligate the account to pay an unexpectedly large cost associated with the utilization. Even if bad actors are not involved, in some cases, users associated with the account may be unaware of the expense of various computing resources and may accidentally request utilization of resources that would tie-up an inordinate amount of resources and/or obligate the account to a potentially significant cost.

Using various implementations of the present disclosure, anomalous resource utilization of an account can be identified substantially in real time. In some cases, the account may be notified of the anomalous utilization before the resources are tied-up or expended by the anomalous utilization and/or before the associated account is obligated to pay an unexpectedly large expense associated with the anomalous utilization.

In various cases, one or more causes of the anomalous utilization can be further identified based on utilization metrics associated with the account. For instance, if a particular linked account (e.g., associated with a single developer) may be responsible for the anomalous utilization, that linked account can be identified as a root cause (e.g., a contributing factor) of the anomalous utilization. In some cases, the linked account may be automatically suspended from affecting the resource utilization of the overall account. In some examples, the resources may be moved to a region or data center associated with a higher expense. If the move of the resources to the new region or data center causes an unexpectedly large expenditure on the part of the account, the move can be identified as a root cause of the anomalous utilization.

In particular examples, various implementations described herein can enable account administrators to efficiently identify the sources of anomalous utilization. For instance, administrators may be enabled to identify the sources of anomalous utilization without manually sorting through individual accounts or usage patterns. Accordingly, various implementations described herein can enable administrators to efficiently prevent further anomalous utilization shortly after the anomalous utilization is detected.

In various examples, anomalies can be detected using flexible machine learning models. Unlike models that rely on static thresholds, these models can be used to distinguish between normal utilization variations (e.g., predictable trends, periodic usage patterns, or the like) and anomalous activity. Although some machine learning models may require a relatively large amount of processing power and/or training data used to train the machine learning models, in some implementations described herein, the machine learning models can be selectively used after a potential anomaly has already been detected using relatively low-processing-cost, threshold-based models (e.g., z-score thresholds).

Various implementations described herein provide improvements to the technical field of network-based computing. For example, various implementations disclosed herein enable anomaly detection substantially in real time. In at least some instances, the root causes of detected anomalies can also be inferred automatically. If the anomalies and/or root causes are reported to administrators as they occur, the administrators can effectively take corrective action to prevent the anomalies from persisting over time. In some cases, a system detecting the anomalies and/or root causes can automatically suspend further resource utilization that could cause the anomalies to persist. For instance, by addressing anomalies substantially in real time, a demand for network-based resources can be reduced. As a result, existing memory and processing resources can be utilized efficiently, bandwidth associated with a service-provider network providing the resources can be enhanced, latency due to traffic through the service-provider network traffic may be reduced, or the like. In addition, unexpected penalties associated with anomalous resource utilization can be addressed early and/or minimized.

FIG. 1 illustrates an example environment 100 for detecting and diagnosing anomalies in resource utilization by one or more accounts. As illustrated, the environment 100 may include one or more administrator devices 102 and one or more liked devices 104.

The administrator device(s) 102 and linked device(s) 104 may be associated with a single account family. As used herein, the term "account" can refer to an arrangement by which one or more users can be given access to utilize various network-based resources. In various implementations, a single account may be managed by a single entity obligated to pay for expenses incurred by the utilization of the network-based resources requested on behalf of the account. In some cases, an "account family" may refer to one or more accounts whose usage of network-based resources may obligate payment from the same entity. An account family may include multiple accounts with different permissions associated with the account family. Example of permissions include a permission to increase utilization of network-based resources on behalf of the account family, to decrease utilization of network-based resources on behalf of the account family, to add new accounts to the account family, to remove accounts from the account family, to settle bills incurred by the account family, or the like.

The administrator device(s) 102 may be associated with an administrator account within the account family. An "administrator account" may refer to an account associated with a manager of the entity and may be associated with a maximum amount of permissions associated with the account family. In some cases, an executive or administrator associated with the entity can access the administrator account.

The linked device(s) 104 may be associated with one or more linked accounts within the account family. A "linked account" may refer to an account associated with a less-than-maximum amount of permissions associated with the account family. A linked account, however, may still have permissions necessary to increase or decrease the utilization of computing resources by the account family. In some cases, a developer associated with the entity can access a linked account.

In various implementations, any one of the administrator device(s) 102 and/or linked device(s) 104 may be an electronic device. The electronic device may be a User Equipment (UE). As used herein, the terms "UE," "user device," "communication device," and "client device," can be used interchangeably to describe any device (e.g., the user device 102) that is capable of transmitting/receiving data over a communication interface. In some cases, the communication interface is a wired interface. In certain examples, the communication interface can correspond to a wireless interface, such that the device can transmit and/or receive data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

According to various examples, the account family associated with the administrator device(s) 102 and the linked device(s) 104 may utilize one or more resources provided by at least one remote host 106. As used herein, the terms "resource," "computing resource," "computer resource," "network-based resource," or their equivalents, can refer to any resource that can be used to store, process, and/or analyze data from a remote device.

As illustrated, the host(s) 106 include a variety of resources that can be utilized by the account family, including at least one memory resource 108, at least one processing resource 110, or at least one service 112. The memory resource(s) 108 may include storage that can be utilized to store data provided by the account family. The processing resource(s) 110 may include processing capacity that can be used to perform operations directed by the account family. The service(s) 112 may include programs, Virtual Machines (VMs), or the like that can be utilized by the account family.

In various implementations, the administrator device(s) 102 and/or the linked device(s) 104 may change a usage level of at least one of the memory resource(s) 108, the processing resource(s) 110, or the service(s) 112 by transmitting requests to a monitor 114 over one or more Wide Area Networks (WANs) 116. As used herein, the term "usage level," "usage amount," "utilization level," "utilization amount," or the like, may refer to an amount of at least one resource used by one or more accounts. For instance, a utilization level of a memory resource may refer to an amount of memory (e.g., a number of gigabytes) in the memory resource that is utilized by an account.

According to some examples, the WAN(s) 116 may relay communications between the administrator device(s) 102, the linked device(s) 104, and a service-provider network including the host(s) 106. The communications may include the requests to the monitor 114. In some cases, the monitor 114 may be part of the service-provider network. An example of the WAN(s) 116 include the Internet. A firewall may be located between the WAN(s) 116 and the service provider network, in some examples.

The monitor 114 may include one or more devices configured to parse requests from the administrator device(s) 102 and/or the linked device(s) 104. In various implementations, the monitor 114 may filter a stream of requests between the WAN(s) 116 and the host(s) 106 according to particular account families being monitored, dimensions, or the like. The monitor 114 may generate utilization data based on the filtered requests. In some cases, the monitor 114 may assign one or more of the memory resource(s) 108, the processing resource(s) 110, and the service(s) 112 to the account family based on the requests.

In various implementations, the monitor 114 may also transmit, to an anomaly engine 116, utilization data indicating at least one utilization level of the memory resource(s) 108, the processing resource(s) 110, and/or the service(s) 112 by the account family. In some cases, the utilization data may indicate at least one time at which the account family has utilized the memory resource(s) 108, processing resource(s) 110, and/or service(s) 112 at the utilization level(s).

According to some implementations, the utilization data may further indicate one or more dimensions of the utilization levels. As used herein, the term "dimension," and its equivalents, can refer to a factor that can potentially affect resource utilization by an account and/or account family. Some examples of dimensions include activity by an individual account (e.g., each one of the accounts in an account family), the type of resource being utilized, a region in which at least one utilized resource is located, or the like.

The anomaly engine 116 may include an anomaly detector 118. The anomaly detector may be configured to detect one or more anomalies in the utilization data. As used herein, the terms "anomaly," "anomalous utilization," or their equivalents, can refer to a suspicious and/or unusual amount of or change in resource utilization by at least one account. In some examples, an anomaly may refer to an unusually high amount, or an unexpected increase, in resource utilization.

In various implementations, the anomaly detector 118 may include multiple layers that can collectively detect the anomaly. As used herein, the terms "layer," "program layer," or their equivalents, can refer to a software and/or hardware component configured to receive an input, to analyze the input, and to produce an output based on analyzing the input.

According to various implementations, the anomaly detector 118 may include at least one decompose layer configured to pre-filter the utilization data prior to detecting anomalies. In some cases, the utilization data may include at least one of a trend component, a seasonality component, or a cycle component. The trend component, the seasonality component, and/or the cycle component may be predictable variations in the utilization data. By prefiltering the utilization data using the decompose layer(s), the anomaly detector 118 can more accurately identify anomalies in the utilization data.

The trend component may include underlying (positive or negative) growth in the utilization data that is relatively slow (e.g., less than a threshold amount of growth per day). To remove the trend component from the utilization data, the decompose layer(s) may smooth the utilization data using Locally Estimated Scatterplot Smoothing (LOESS) nonlinear smoothing. In various implementations, the LOESS nonlinear smoothing can be performed using the rolling average of the utilization data. In particular cases, the LOESS nonlinear smoothing can be performed using the rolling median of the utilization data.

The seasonality component may include regular and predictable changes that recur periodically (e.g., each week and/or month). To remove the seasonality component from the utilization data, the decompose layer(s) may utilize a moving average convolution filter on the utilization data. The filter may be applied with at least one window corresponding to at least one predetermined time period. For instance, the filter can be applied at least one of daily, weekly, monthly, or the like. In some cases, the filter may be a box-shaped function with a width of 2 M+1 and an amplitude of 1/(2 M+1), wherein "M" is the average (e.g., mean or median) of the utilization data in the window, the total average of the utilization data, or the like.

The cycle component may include unseasonable patterns with inconsistent widths. For instance, a cycle component could be a pattern in the utilization data that repeats on the first day of every month, wherein the months have inconsistent lengths (e.g., 28 days, 30 days, and 31 days). To identify the cycle component in the utilization data, the decompose layer(s) may regress time-based dummy variables (e.g., day of the month, day of the week, interaction term, or the like) on the utilization data. In some cases, the decompose layer(s) may use tree-based regression to capture the effect of the dummy variables on the utilization data. Once the cycle component has been identified, the cycle component can be subtracted or otherwise removed from the utilization data.

The anomaly detector 118 may include at least one detection layer configured to identify possible anomalies in the utilization data. In various implementations, the detection layer may analyze the utilization data after it has been filtered by the decompose layer(s). According to some implementations, the detection layer can be omitted from the anomaly detector 118. In some cases, the detection layer may compare the utilization levels within the utilization data to a particular range associated with previous, non-anomalous utilization data by the account family. The particular range may be based on an average (e.g., a mean, a median, or the like) and a standard deviation of the non-anomalous utilization data. For instance, the particular range may be, for instance, a particular (e.g., 90%, 95%, or the like) confidence interval associated with the previous utilization data. If the utilization levels within the utilization data are within the range, the detection layer may determine that the utilization data is non-anomalous. If, however, any utilization level within the utilization data is outside of the range (e.g., above the range), the detection layer may determine that the utilization level corresponds to a potential (or possible) anomaly and may refer the utilization data to multiple discrimination layers for further processing. As used herein, the term "non-anomalous" can refer to data that does not differ significantly from previous data. In contrast, the term "anomalous" can refer to data that includes at least one anomaly. An anomaly (also referred to as an "outlier") may be any data point that differs significantly from previous data. For instance, if the utilization data includes a utilization level that increases rapidly and significantly at a particular time point (e.g., due to the sudden utilization of a large and/or different amount of computing resources than were previously utilized by the account(s)), the utilization data may be anomalous. However, if the utilization data includes a utilization level that is relatively steady over time (e.g., due to limited variation in type and amount of computing resources), the utilization data may be non-anomalous.

The anomaly detector 118 may further include the multiple discrimination layers. According to some implementations, the multiple discrimination layers may analyze the utilization data in parallel. In various implementations, the discrimination layers may analyze the utilization data after it has been filtered by the decompose layer(s). Each discrimination layer may be configured to analyze the utilization data and generate an "anomaly score" or "vote" corresponding to a conclusion and/or likelihood that the utilization data contains an anomaly. In some cases, the anomaly score generated by a given discrimination layer represents a Boolean data type (e.g., either "true" if the likelihood of an anomaly is greater than a threshold or "false" if the likelihood of the anomaly is less than or equal to the threshold). In some cases, the BigDecimal class can be used to round the anomaly score to a minimum value (e.g., 0) or a maximum value (e.g., 1) according to a predetermined threshold.

In various implementations, the multiple discrimination layers may analyze the utilization data in different ways. The multiple discrimination layers may apply different anomaly detection models to the utilization data. For instance, at least one of the multiple discrimination layers may include one or more machine learning models that can be trained to identify anomalies in the utilization data based on the previous utilization data. In some examples, the multiple discrimination layers can include at least one of a standard deviation-based discrimination layer, a random cut forest discrimination layer, a one-class Support Vector Machine (SVM) discrimination layer, an elliptic envelope discrimination layer, or any other type of discrimination layer configured to perform novelty and/or outlier detection on the utilization data. Various examples of machine learning models utilized by the discrimination layers are described in further detail, below, with reference to FIG. 2.

In various cases, the anomaly scores generated by the various discrimination layers can be used to confirm whether an anomaly is present in the utilization data. For example, if the anomaly scores indicate that greater than a threshold percentage (e.g., 50%) of the multiple discrimination layers have identified one or more anomalies in the utilization data, the anomaly detector 118 may determine that there is at least one anomaly in the utilization data.

In various implementations, the anomaly detector 116 may generate a message indicating the at least one anomaly in the utilization engine. In various implementations, the anomaly engine 116 may transmit the message to the administrator device(s) 102. According to some implementations, the message may be transmitted over the monitor 114 and/or the WAN(s) 116. The administrator device(s) 102 may output the message as a Simple Notification Service (SNS) message, as an e-mail, or the like. The administrator device(s) 102 may output the message on a User Interface (UI), so that a user associated with the administrator device(s) 102 may have the opportunity to take corrective action on the at least one detected anomaly. In some cases, transmission of the message by the anomaly engine 116 may cause the administrator device(s) 102 to output the message.

The anomaly engine 116 may further include a root cause analyzer 120. In response to the anomaly detector 118 identifying a given anomaly in the utilization data, the root cause analyzer 120 may be configured to identify a root cause of the anomaly. As used herein, the terms "root cause," "contributing factor," and their equivalents, can refer to a dimension that is at least correlated with a particular anomaly.

In some implementations, the root cause analyzer 120 may include multiple analysis layers, each of which may be configured to identify whether a particular root cause is at least one contributor of at least one detected anomaly. In various cases, each analysis layer may be configured to identify a dimension score corresponding to a correlation between a particular dimension in the utilization data and the anomaly. According to some implementations, a first analysis layer may determine a first dimension score indicating whether a first dimension is a root cause of a detected anomaly. If the first dimension score is below a particular threshold, the first dimension score may indicate a relatively low correlation between the first dimension and the anomaly, and the first analysis layer may forward the utilization data to a second analysis layer, which may, in turn, determine a second dimension score indicating whether a second dimension is a root cause of the detected anomaly, and so on. The multiple analysis layers may be arranged in series and in a particular order. For instance, a first analysis layer may evaluate a correlation between the detected anomaly and utilization of individual resources or services, a second analysis layer may evaluate a correlation between the detected anomaly and usage by individual linked accounts in the account family, a third analysis layer may evaluate a correlation between the detected anomaly and utilization of resources at individual regions in the network, and a fourth analysis layer may evaluate a correlation between the detected anomaly and types of resource usage, wherein the particular order is the first analysis layer, the second analysis layer, the third analysis layer, and the fourth analysis layer connected in series.

The root cause analyzer 120 may further include an aggregator configured to receive confidence levels output by one or more of the analysis layers. The aggregator may identify one or more root causes indicated by the confidence levels and may generate a message indicating the root cause(s). In various implementations, the anomaly engine 116 may transmit the message to the administrator device(s) 102. According to some implementations, the message may be transmitted over the monitor 114 and/or the WAN(s) 116.

The administrator device(s) 102 may output the message on a UI, so that a user associated with the administrator device(s) 102 may have the opportunity to take corrective action on the root cause(s). In some cases, transmission of the message by the anomaly engine 116 may cause the administrator device(s) 102 to output the message. The administrator device(s) 102 may output the message as an SNS message, as an e-mail, or the like. In various implementations, the administrator device(s) 102 may display at least one image illustrating a detected anomaly and/or root cause (e.g., a utilization of the root cause of a detected anomaly over time).

In some cases, the administrator device(s) 102 may receive feedback from one or more users in response to outputting the message. For instance, a user of the administrator device(s) 102 may input, into an input device of the administrator device(s) 102, feedback indicating that a detected anomaly and/or root cause indicated by the message is helpful or unhelpful. The administrator device(s) 102 may cause the feedback to be delivered to the anomaly engine 116, which may further train one or more machine learning models within the anomaly engine 116 to ignore potential anomalies whose notifications the user(s) indicate as being unhelpful, and/or to increase the sensitivity of detecting anomalies whose notifications the user(s) indicate as being helpful. Accordingly, the feedback may be used to improve sensitivity and specificity of the anomaly detection and/or root cause analysis performed by the anomaly engine 116.

According to various implementations, the anomaly engine 116 may automatically perform corrective action when an anomaly corresponding to a particular root cause is detected. For example, the administrator account associated with the administrator device(s) 102 may have a particular setting activated that will automatically suspend actions by any linked account associated with one of the linked device(s) 104 when actions of the linked account are responsible for an anomaly. Accordingly, if the root cause analyzer 120 identifies a linked account whose actions are a root cause of a detected anomaly, the anomaly engine 116 may cause the linked account to be suspended from increasing resource utilization of the account family.

Figure 2:
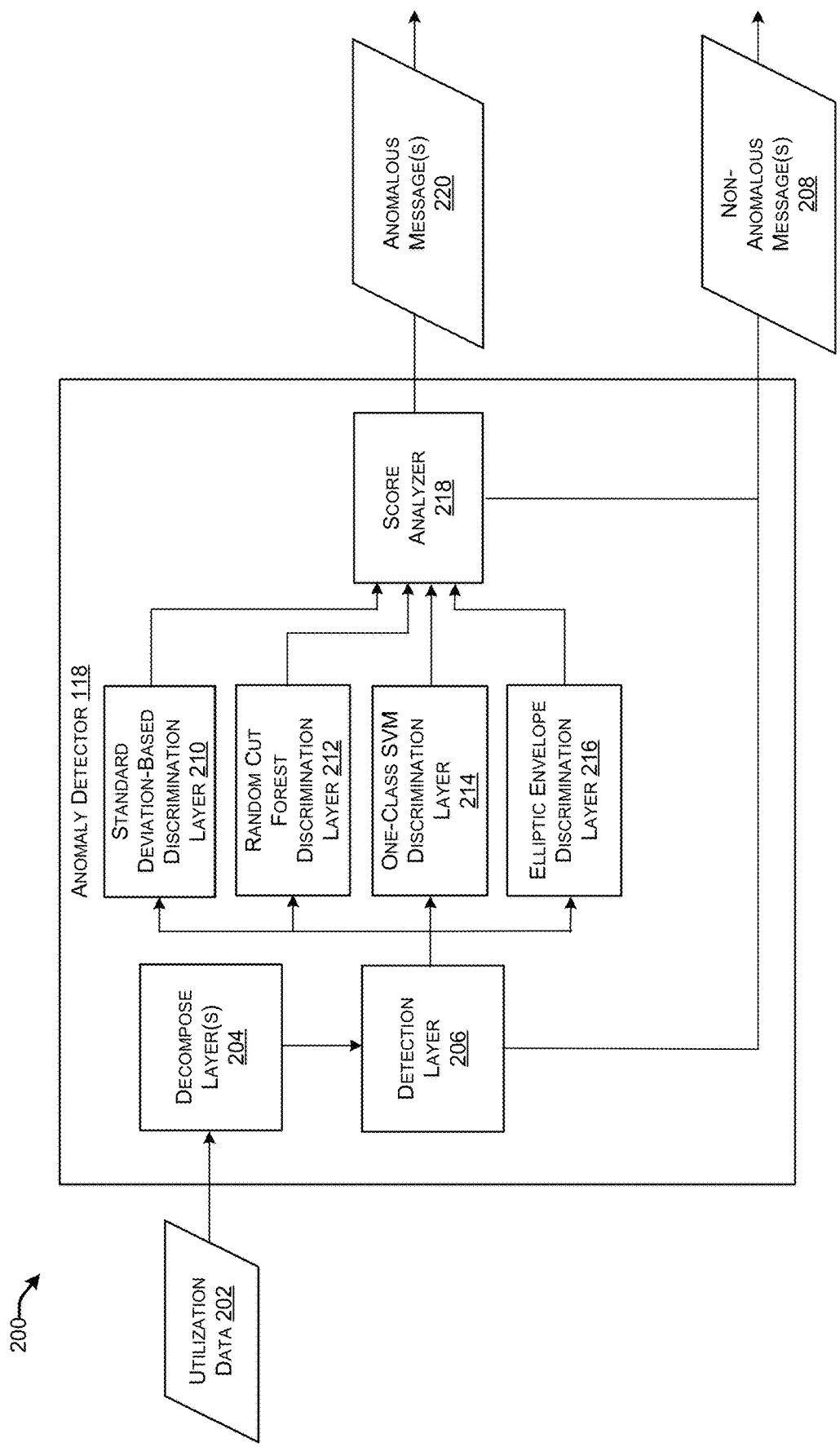

FIG. 2 illustrates an example environment 200 for detecting an anomaly based on utilization levels of one or more accounts. As illustrated, the environment 200 includes the anomaly detector 118 described above with reference to FIG. 1. The account(s) may be a single account, multiple accounts within the same account family, or the like.

Utilization data 202 may be input into at least one decompose layer 204 within the anomaly detector 118. In some cases, the utilization data 202 may include utilization levels of one or more resources by the account(s). In some cases, the utilization data 202 may include times at which the account(s) utilized the resource(s) at the utilization levels. For instance, the utilization data 202 may include data points representing utilization levels over time.

Although the account(s) may utilize multiple resources, in some cases, the utilization of the multiple resources at a given time can be combined into a single aggregate metric. The single aggregate metric may be referred to as a "cost" of the resource utilization by the account(s). In some cases, the utilization level of each resource may be related linearly to cost. For example, a given utilization level can be converted to cost by multiplying the given utilization level by a constant. In some cases, the cost of each resource utilization at each time may be summed into a metric referred to as "total cost." According to various implementations, the utilization data 202 may include a total cost of the utilization of multiple resources by the account(s).

In some cases, the utilization data 202 may include first utilization levels by the account(s) during a first time period as well as one or more second utilization levels by the account(s) during a second time period. The first time period may occur before the second time period, such that the first utilization levels may represent previous utilization levels associated with the account(s).

According to some implementations, the utilization data 202 may be prefiltered using the decompose layer(s) 204. For instance, at least one of a trend component, a seasonality component, and a cycle component may be removed from the utilization data 202 prior to the utilization data 202 being input into a detection layer 206.

The trend component may include underlying (positive or negative) growth in the utilization data 202 that is relatively slow (e.g., less than a threshold amount of growth per day). To remove the trend component from the utilization data 202, the decompose layer(s) 204 may smooth the utilization data 202 using LOESS nonlinear smoothing. In various implementations, the LOESS nonlinear smoothing can be performed using the rolling average of the utilization data 202. In particular cases, the LOESS nonlinear smoothing can be performed using the rolling median of the utilization data 202.

The seasonality component may include regular and predictable changes that recur periodically (e.g., each week and/or month). To remove the seasonality component from the utilization data 202, the decompose layer(s) 204 may utilize a moving average convolution filter on the utilization data 202. The filter may be applied with at least one window corresponding to at least one predetermined time period. For instance, the filter can be applied at least one of daily, weekly, monthly, or the like. In some cases, the filter may be a box-shaped function with a width of 2 M+1 and an amplitude of 1/(2 M+1), wherein "M" is the average (e.g., mean or median) of the utilization data 202 in the window, the total average of the utilization data 202, or the like.

The cycle component may include unseasonable patterns with inconsistent widths. For instance, a cycle component could be a pattern in the utilization data 202 that repeats on the first day of every month, wherein the months have inconsistent lengths (e.g., 28 days, 30 days, and 31 days). To identify the cycle component in the utilization data 202, the decompose layer(s) 204 may regress time-based dummy variables (e.g., day of the month, day of the week, interaction term, or the like) on the utilization data 202. In some cases, the decompose layer(s) 204 may use tree-based regression to capture the effect of the dummy variables on the utilization data 202. Once the cycle component has been identified, the cycle component can be subtracted or otherwise removed from the utilization data 202. After the utilization data 202 has been filtered, it may be forwarded to the detection layer 206.

According to various implementations, the detection layer 206 may identify a range of expected utilization based on the first utilization levels during the first time period. In some cases, the detection layer 206 may identify an average (e.g., a population mean, a population median, or the like) and a standard deviation of the first utilization levels. The detection layer 206 may define the range based on the average and the standard deviation. In various examples, the detection layer 206 may define the range as a one-sided or two-sided particular percentage confidence interval. The confidence interval may correspond to a confidence level of, for instance, 80%, 85%, 90%, 95%, 96%, 97%, or some other percentage between 0% and 100%. According to various implementations, the first utilization levels may be assumed to have a Gaussian distribution. The range can be defined according to the following Equations 1:

$$T_{Upper} = \bar{x} + z^* \sigma$$

$$T_{Lower} = \bar{x} - z^* \sigma$$

wherein $T_{Upper}$ is an upper threshold of the range, $\bar{x}$ is the average, $z^*$ is the z-score associated with the particular percentage, $\sigma$ is the standard deviation, and the $T_{Lower}$ is a lower threshold of the range. In some cases, the z-score is equal to 1.75.

In various cases, the detection layer 206 may determine whether the second utilization level(s) is outside of the range. If the second utilization level(s) are within the range, there may be a relatively low chance that an anomaly could be present within the second utilization level(s). In response to identifying that the second utilization level(s) are within the range, the detection layer 206 and/or the anomaly detector 118 may output one or more non-anomalous messages 208. The non-anomalous message(s) 208 may indicate that the utilization of the resource(s) by the account(s) is non-anomalous.

However, if the second utilization level(s) are outside of the range, there may be a chance that an anomaly is present within the second utilization level(s). In these cases, the detection layer 206 may forward at least the second utilization level(s) of the utilization data 202 to each one of multiple discrimination layers.

The multiple discrimination layers may apply different anomaly detection models. The multiple discrimination layer may include, for instance, a standard deviation-based discrimination layer 210, a random cut forest discrimination layer 212, a one-class SVM discrimination layer 214, and an elliptic envelope discrimination layer 216. The discrimination layers may be arranged in parallel, such that each one of the multiple discrimination layers may receive the (at least portion of) utilization data 202.

In various implementations, the standard deviation-based discrimination layer 210 may utilize a standard deviation-based anomaly detection model. The standard deviation-based discrimination layer 210 may use an average (e.g., a mean, a median, or the like) and a standard deviation of the utilization data 202 to confirm whether the anomaly is present. In some cases, the standard deviation-based discrimination layer 210 may utilize an average and standard deviation of a portion of the utilization data 202 representing a time span within 20 to 400 days (e.g., a time span of at least 120 days, or less if the account lacks a sufficient amount of historical data). The average and standard deviation used by the standard deviation-based discrimination layer 210 may of at least a portion of the first utilization levels in the utilization data 202. The standard deviation-based discrimination layer 210 may output an anomaly score indicating a likelihood that the second utilization level(s) contain an anomaly based on a distance between the second utilization level(s) and the average. In various cases, the distance may be determined in units of the standard deviation, such that the distance is represented as a z-score. In various examples, the z-score can be rescaled to an interval of [0,1], wherein a minimum historical z-score of the utilization data 202 corresponds to 0 and a maximum historical z-score of the utilization data 202 corresponds to 1. For instance, the confidence score may be the quotient of the difference between the tested z-score and the minimum z-score and the difference between the maximum z-score and the minimum z-score. The anomaly score produced by the standard deviation-based discrimination layer 210 may be proportional to the distance.

In various examples, the random cut forest discrimination layer 212 may be configured to confirm whether the anomaly is present based by determining whether any anomalous data points are within the utilization data 202. The random cut forest discrimination layer 212 may include an anomaly detection model that is a random cut forest model. The random cut forest model may include a predetermined number of decision trees. Each decision tree may be trained to output a confidence score corresponding to the likelihood that a sample is anomalous based on at least a subset of the utilization data 202. According to some implementations, the confidences output by the multiple trees can be averaged into a single anomaly score output by the random cut forest discrimination layer 212.

In various instances, the number of trees in the random cut forest discrimination layer 212 may be between 5 and 20 trees. For instance, the predetermined number of trees may be 7 trees. According to various implementations, the random cut forest model in the random cut forest discrimination layer 212 uses the predetermined number of trees without shingling.

In various cases, the one-class SVM discrimination layer 214 may utilize an anomaly detection model that is a one-class SVM model (also referred to as a "single-class SVM model") to identify anomalous points in the utilization data 202. In various examples, the one-class SVM may have a Radial Basis Function (RBF) kernel with a parameter $\gamma = 1/500$ and a margin $\nu = 0.5$.

The elliptic envelope discrimination layer 216 may, according to various implementations, detect anomalous points in the utilization model 202 using an anomaly detection model that is an elliptic envelope model. The elliptic envelope model may be an anomaly detection model that assumes training data has a Gaussian distribution. The elliptic envelope model may learn an ellipse that envelops the training data. For instance, the elliptic envelope model may learn an ellipse that at least partially envelops the first utilization levels. The model may return an anomaly score based on the likelihood that any new data point is an anomaly based on the distance between the learned ellipse and the new data point. For example, the model may return an anomaly score indicating whether the second utilization level(s) are an anomaly based on the distance between the second utilization level(s) and the ellipse generated based on the first utilization levels.

In various implementations of the present disclosure, the elliptic envelope model in the elliptic envelope discrimination layer 216 may lack an assumed center. In some cases, the elliptic envelope model lacks a supported fraction. In various examples, the elliptic envelope model may have an estimated contamination of 20%, 25%, 30%, or some other percentage. For instance, the model may have an estimated contamination of 2-4%. In some cases, the model may have an estimated contamination of as much as 22.6%.

Unlike the standard deviation-based discrimination layer 210, each one of the random cut forest discrimination layer 212, the one-class SVM discrimination layer 214, and the elliptic envelope discrimination layer 216 may utilize at least one machine learning model that can be trained based on at least a portion of the utilization data 202. In some cases, the at least one machine learning model can be further trained based on administrator feedback. In addition, the random cut forest discrimination layer 212, the one-class SVM discrimination layer 214, and the elliptic envelope discrimination layer 216 may be able to distinguish between ordinary periodicity within the utilization data 202 (e.g., predictable trends, periodic variations, or the like) and anomalies. In addition, pre-filtering using one or more decompose layers, as described above, can further enhance the accuracy of the anomaly detection by the standard deviation-based discrimination layer 210, each one of the random cut forest discrimination layer 212, the one-class SVM discrimination layer 214, and the elliptic envelope discrimination layer 216.

For instance, the utilization data 202 may periodically vary such that a total cost peaks at noon every day. In some cases, the standard deviation-based discrimination layer 210 may erroneously identify an anomaly at each of the peaks. However, a machine learning model in at least one of the random cut forest discrimination layer 212, the one-class SVM discrimination layer 214, and the elliptic envelope discrimination layer 216 may identify historic periodicity in the utilization data 202 and refrain from identifying an anomaly based on the peaks at noon every day.

In example implementations, each one of the standard deviation-based discrimination layer 210, the random cut forest discrimination layer 212, the one-class SVM discrimination layer 214, and the elliptic envelope discrimination layer 216 may be configured to output an anomaly score or vote indicating whether that detection layer determined an anomaly was present in the second utilization level(s).

A score analyzer 218 may confirm whether an anomaly is present based on the anomaly scores from the multiple discrimination layers. In various cases, the score analyzer 218 may identify the anomaly if at least half of the discrimination layers generates an anomaly score indicating that the anomaly is present. In some implementations, the score analyzer 218 may calculate an anomaly score, which may correspond to a severity of a detected anomaly. The anomaly score calculated by the score analyzer 218 may be the Euclidian norm of the anomaly scores output by the multiple discrimination layers. In some cases, each one of the discrimination layers (e.g., the standard deviation-based discrimination layer 210, the random cut forest discrimination layer 212, the one-class SVM discrimination layer 214, and the elliptic envelope discrimination layer 216) may output an anomaly score that ranges between 0 and 1, wherein 0 represents no confidence that the utilization data 202 includes an anomaly and 1 represents a maximum score that the utilization data 202 includes an anomaly. In various examples, the score analyzer 218 may calculate an aggregate anomaly score by averaging the anomaly scores output by the discrimination layers.

If the score analyzer 218 determines that the anomaly is present, the score analyzer 218 and/or the anomaly detector 118 may output one or more anomalous messages 220. In various examples, the anomalous message(s) 220 may include the anomaly score. The anomalous message(s) 220 may be output to various recipients, such as one or more administrator devices (e.g., the administrator device(s) 102 described above with reference to FIG. 1) associated with the account(s), a root cause analyzer (e.g., the root cause analyzer 118 described above with reference to FIG. 1), a database (e.g., that stores indications of anomalies for later analysis), or the like. In some cases, the anomalous message(s) 220 may cause the root cause analyzer to identify one or more root causes of the detected anomaly.

However, if the score analyzer 218 determines that less than half of the discrimination layers generated a confidence score indicating the anomaly is present, the score analyzer 218 and/or the anomaly detector 118 may output the non-anomalous message(s) 208. In some cases, the non-anomalous message(s) 208 may be output to at least one of the administrator device(s), the root cause analyzer, the database, or the like. In response to receiving the non-anomalous message(s) 208, the administrator device(s) may output an indication of the non-anomalous message(s) 208, the root cause analyzer may refrain from inspecting the utilization data 202, the database may store at least a portion of the non-anomalous message(s) 208, or the like.

Figure 3:
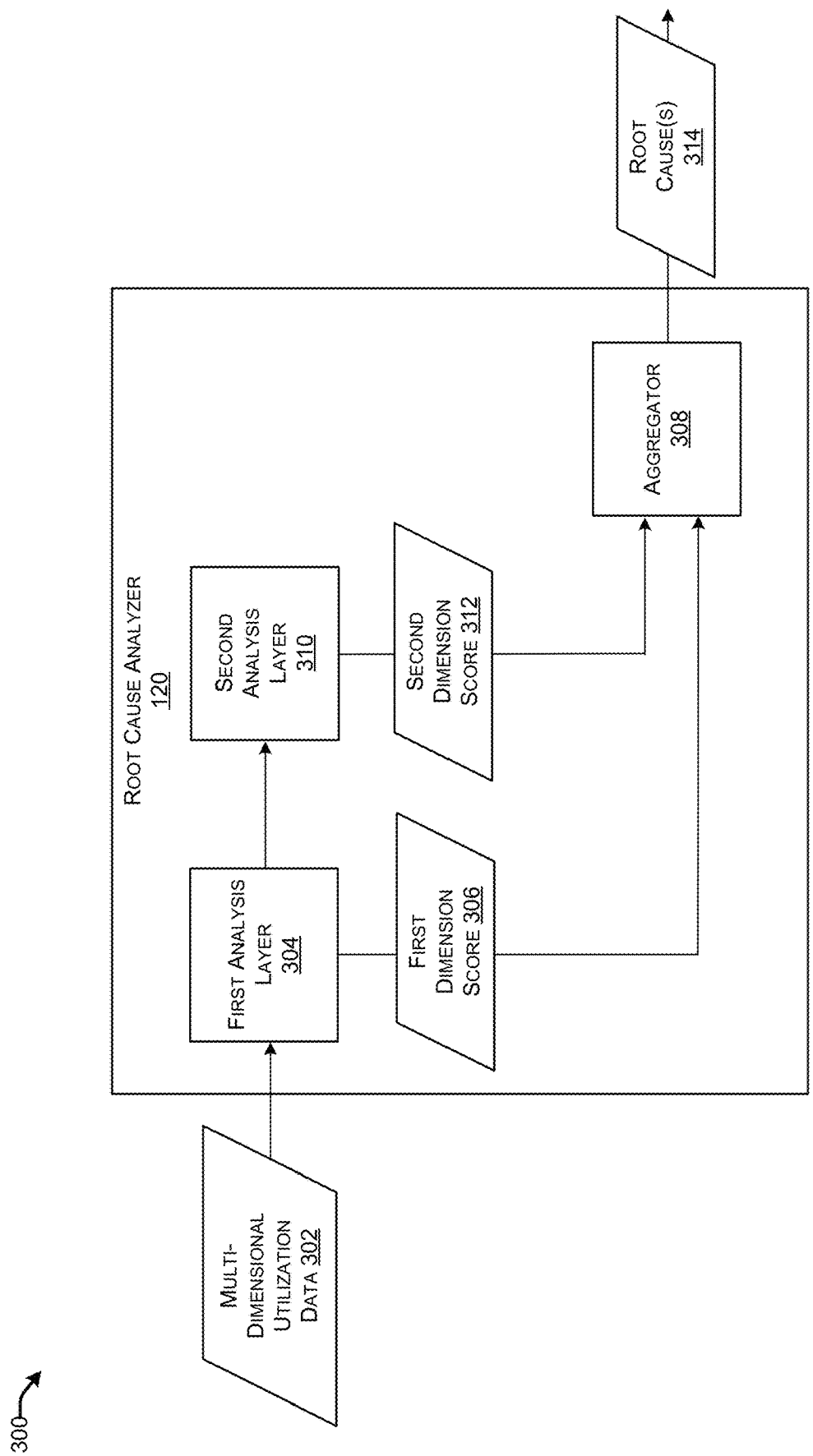
FIG. 3 illustrates an example environment for identifying at least one root cause of an anomaly based on utilization levels of an account and/or account family.

FIG. 3 illustrates an example environment 300 for identifying a root cause of an anomaly based on utilization levels of an account and/or account family. As illustrated, the environment 300 includes the root cause analyzer 120 described above with reference to FIG. 1.

The environment 300 may be used to analyze multi-dimensional utilization data. In some examples, the multi-dimensional utilization data 302 can include data indicating at least two dimensions of resource utilization by at least one account. In various implementations, the root cause analyzer 120 may analyze multi-dimensional utilization data 302 after at least one anomaly has been confirmed in the multi-dimensional utilization data 302. For instance, the root cause analyzer 120 may receive at least one anomalous message (e.g., anomalous message(s) 220) indicating that an anomaly is present in the multi-dimensional utilization data 302. In some cases, the multi-dimensional utilization data 302 may be the same utilization data (e.g., utilization data 202) analyzed by a corresponding anomaly detector (e.g., anomaly detector 118). In some examples, the multi-dimensional utilization data 302 may include the same or different data indicating utilization and dimensions of utilization by the account(s) as the utilization data analyzed by the anomaly detector during the same time period as the utilization data analyzed by the anomaly detector.

The multi-dimensional utilization data 302 may be input into a first analysis layer 304. The first analysis layer 304 may analyze the multi-dimensional utilization data 302 in view of a first dimension. The first analysis layer 304 may generate a first dimension score 306 based on a level of association or correlation between the detected anomaly and the first dimension. The first analysis layer 304 may output the first dimension score 306 to an aggregator 308.

In various implementations, the first dimension score 306 may correspond to a correlation coefficient that is between 0 and 1. Various types of correlation analysis can be utilized to generate the first dimension score 306, such as at least one of Pearson's correlation coefficient, Spearman's rank correlation coefficient, Spearman rank correlation analysis, or Kendall rank correlation coefficient. In some cases, the first dimension score 306 can be equal to or at least correspond to Pearson's correlation coefficient between data corresponding to the first dimension and the total cost. In various examples, the first dimension score 306 can be the absolute value of the Pearson's correlation coefficient. For instance, assuming n samples of total cost utilization levels in which an anomaly is present are correlated to n samples of utilization levels of the first dimension, wherein the total cost samples and the first dimension samples correspond to the same time points, the first dimension score 306 can be calculated using the following Equation 2:

$$r_{X,Y} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

wherein r is the correlation coefficient, $x_i$ is the utilization level of the first dimension at sample i, $\bar{x}$ is the average of the utilization levels of the first dimension, $y_i$ is the total cost at sample i, and $\bar{y}$ is the average of the total cost. In various implementations, the samples evaluated in the multi-dimensional utilization data 302 may be within a particular time interval of the detected anomaly (e.g., samples of utilization levels within 5 days prior to the detected anomaly).

In some cases, the first analysis layer 304 may forward the multi-dimensional utilization data 302 to a second analysis layer 310 for further processing. In various implementations, the first analysis layer 304 may forward the multi-dimensional utilization data 302 in response to identifying that the first dimension score 306 is below a particular threshold (e.g., less than a threshold in a range of 0.50-1.0, such as 0.85). However, in some implementations, the first analysis layer 304 may refrain from forwarding the multi-dimensional utilization in response to identifying that the first dimension score 306 is greater than or above the particular threshold.

Similar to the first analysis layer 304, the second analysis layer 310 may analyze the multi-dimensional utilization data 302 in view of a second dimension. The second analysis layer 310 may generate a second dimension score 312 based on a level of association between the detected anomaly and the first dimension. The second analysis layer 310 may output the second dimension score 312 to the aggregator 308. In some cases, the second analysis layer 310 may calculate the second dimension score 312 according to Equation 2.

Although not illustrated in FIG. 3, the root cause analyzer 120 may include one or more additional analysis layers associated with additional dimensions of the multi-dimensional utilization data 302. For instance, the second analysis layer 310 may forward the multi-dimensional utilization data 302 to one of the additional analysis layer(s) in response to identifying that the second dimension score 312 is above a particular threshold (e.g., a threshold within a range of 0.50-1.0, such as 0.85).

In various cases, the first analysis layer 302, the second analysis layer 310, and any additional analysis layers may be arranged, in series, according to a particular order. For instance, dimensions that are the easiest to detect may be evaluated before the dimensions that may be more difficult to correlate with detected anomalies. For instance, the first dimension(s) to be evaluated may correspond to different services and/or resources that can be utilized, the second dimension(s) to be evaluated may correspond to different accounts that can utilize resources on behalf of the account family, the third dimension(s) to be evaluated may correspond to different geographic regions at which the resources utilized are located, and the fourth dimension(s) to be evaluated may correspond to the different types usage of resources by the account family. In some implementations, the first analysis layer 302 may be arranged before the second analysis layer 310 in the root cause analyzer 120 because the first dimension is historically more likely to cause an anomaly than the second dimension. In various cases, the first analysis layer 302 may be arranged before the second analysis layer 310 in the root cause analyzer 120 because the first dimension is more easily correlated to anomalies than the second dimension.

The aggregator 308 may identify one or more root causes 314 of the anomaly based on the first dimension score 306 and/or the second dimension score 312. In some cases, the aggregator 308 may define, as the root cause(s) 314, any dimension that is associated with a greater than a threshold confidence score (e.g., 0.85). For instance, if the first dimension score 306 is above the threshold, the aggregator 308 may define the first dimension as one of the root cause(s) 314. If the second dimension score 312 is above the threshold, the aggregator 308 may define the second dimension as one of the root cause(s) 314. In various examples, the aggregator 308 may identify at least one of the greatest confidence scores as the root cause(s) 314. For instance, if the first dimension score 306 is greater than the second dimension score 312, the aggregator 308 may identify the first dimension score 306 as the root cause(s) 314 and may refrain from identifying the second dimension score 312 as the root cause(s) 314. In some implementations, the aggregator 308 may identify any dimension score that is greater than a threshold percentage of the maximum dimension score (e.g., 40% of the greatest dimension score considered) as part of the root cause(s) 314. For instance, if the first dimension score 306 is greater than the threshold confidence score of 0.85, and the second dimension score 312 is greater than a threshold percentage of 40% of the first dimension score 306, then both the first dimension and the second dimension may be identified as root causes 314.

The aggregator 308 and/or the root cause analyzer 120 may output the root cause(s) 314. In various implementations, the root cause(s) 314 may be output to various recipients, such as one or more administrator devices (e.g., the administrator device(s) 102 described above with reference to FIG. 1) associated with the account(s), a root cause analyzer (e.g., the root cause analyzer 118 described above with reference to FIG. 1), a database (e.g., that stores indications of root causes for later analysis), or the like. In some cases, the root cause(s) 314 may cause the administrator device(s) to output indications of the root cause(s), such that an administrator associated with the administrator device(s) can take corrective action to prevent the anomaly from persisting.

Figure 4:
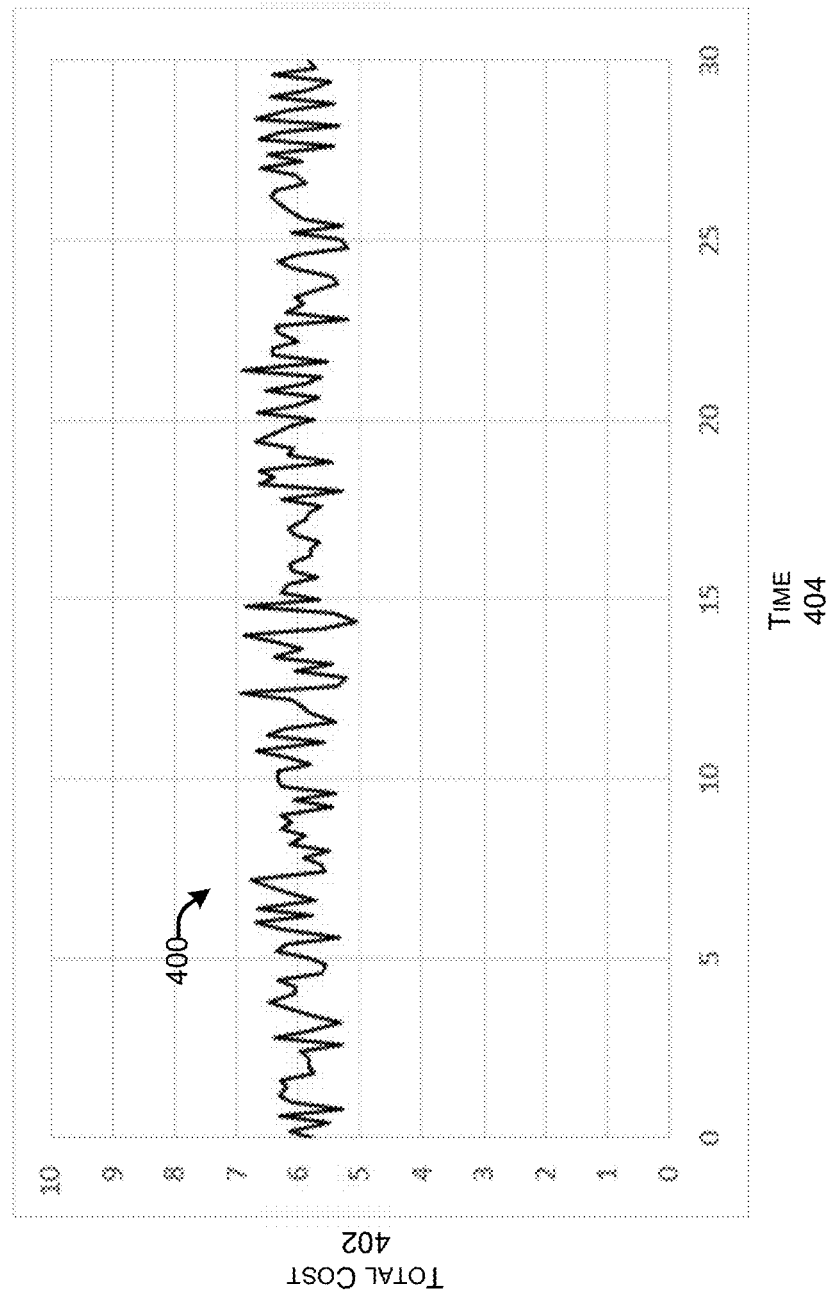
FIG. 4 illustrates an example plot of utilization data associated with one or more accounts. In various implementations, the utilization data can represent non-anomalous utilization data.

FIG. 4 illustrates an example plot of utilization data 400. In various implementations, the utilization data 400 can represent non-anomalous utilization data of one or more accounts.

As illustrated, the utilization data 400 can include multiple data points defined according to total cost of utilization levels by one or more accounts over time. For instance, each total cost value may represent a sum of costs accrued by the account(s) associated with multiple dimensions. In some cases, the total cost can be in units of a penalty, such as a currency-based cost. In various implementations, time can be in units of days.

In various implementations, an anomaly engine (e.g., the anomaly engine 116 described above with reference to FIG. 1), an anomaly detector (e.g., the anomaly detector 118 described above with reference to FIGS. 1 and 2), or the like, can define a range representing non-anomalous behavior by the account(s). For example, an average (e.g., mean, median, or the like) and/or standard deviation can be calculated based on the data points in the utilization data 400. The range may be defined according to Equations 1, in various examples. The range may be utilized to identify potential anomalies in future utilization data associated with the account(s).

Figure 5:
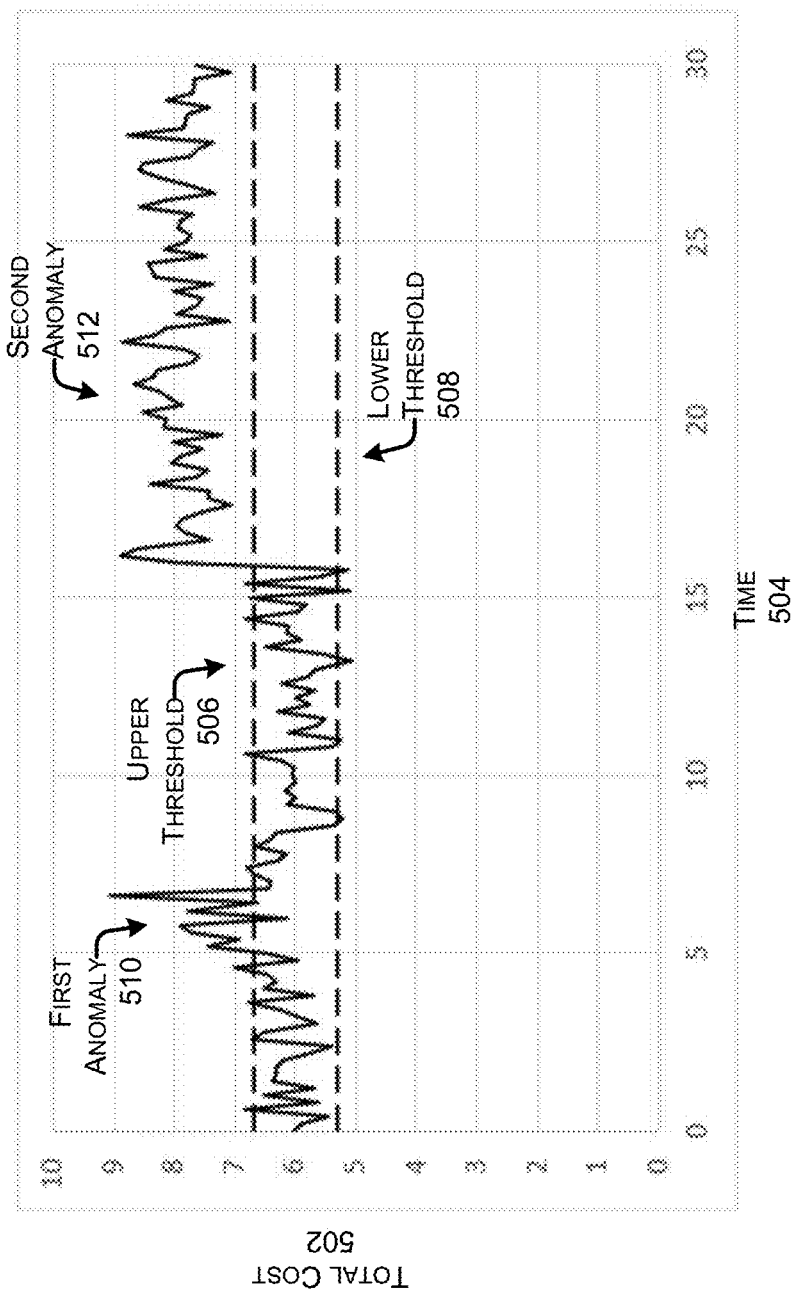
FIG. 5 illustrates an example plot of utilization data compared to a predefined range. In various implementations, the utilization data can represent anomalous utilization data.

FIG. 5 illustrates an example plot of utilization data 500 compared to a predefined range. In various implementations, the utilization data 500 can represent anomalous utilization data.

As illustrated, the utilization data 500 can include multiple data points defined according to total cost 502 of utilization levels by one or more accounts over time 504. For instance, each total cost value 502 in the utilization data 500 may represent a sum of costs accrued by the account(s) associated with multiple dimensions. In some cases, the total cost 502 can be in units of a penalty, such as a currency-based cost. In various implementations, time 504 can be in units of days.

The utilization data 500 may be associated with the same account(s) as the utilization data 400 described above with reference to FIG. 4. Accordingly, the utilization data 500 may be compared to the range derived using the utilization data 400. As illustrated in FIG. 5, the range includes an upper threshold 506 and a lower threshold 508. In the example illustrated in FIG. 5, the upper threshold 506 and the lower threshold 508 represent a 90% confidence interval of the utilization data 400.

In various implementations, any data point or group of data points within the utilization data 500 that falls outside of the range (e.g., is above the upper threshold 506 and/or is below the lower threshold 508) may represent a possible anomaly. In various implementations, a discrimination layer (e.g., the detection layer 206 described above with reference to FIG. 2) may identify point(s) at which the utilization data 500 is outside of the range and may forward at least a portion of the utilization data 500 to multiple discrimination layers for further analysis. The multiple discrimination layers may analyze the utilization data 500 in parallel to confirm whether an anomaly is present.

For instance, in the utilization data 500 illustrated in FIG. 5, a first anomaly 510, at which the utilization data 500 exceeds the upper threshold 506, may be detected between time=5 and time=7. A second anomaly 512, at which the utilization data 500 exceeds the upper threshold 506, may be detected at time=15 and may persist until the end of the utilization data 500 at time=30. In various implementations, the root causes of the anomalies 510 and 512 can be detected by individually analyzing dimensions of the utilization data 500.

Figure 6B:
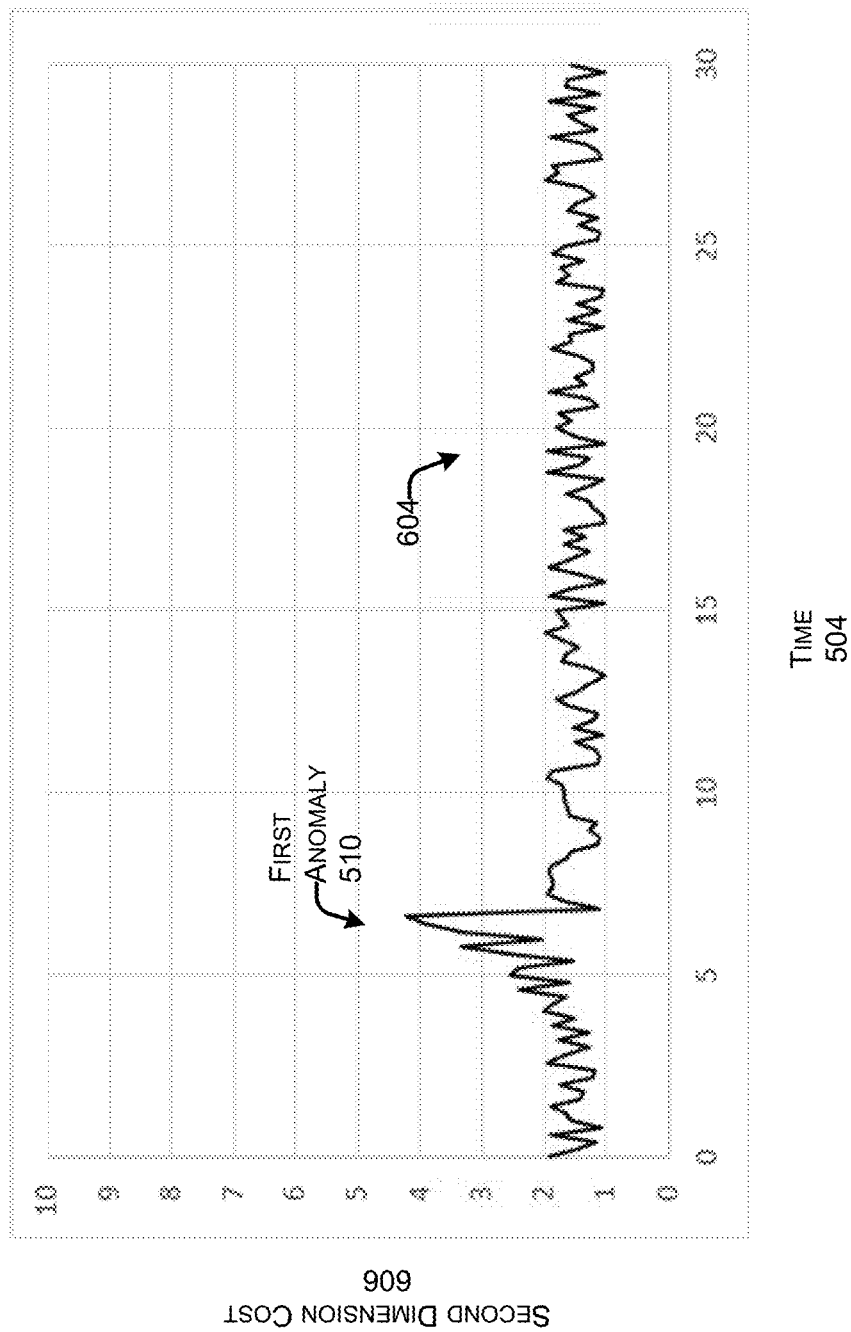
Figure 6C:
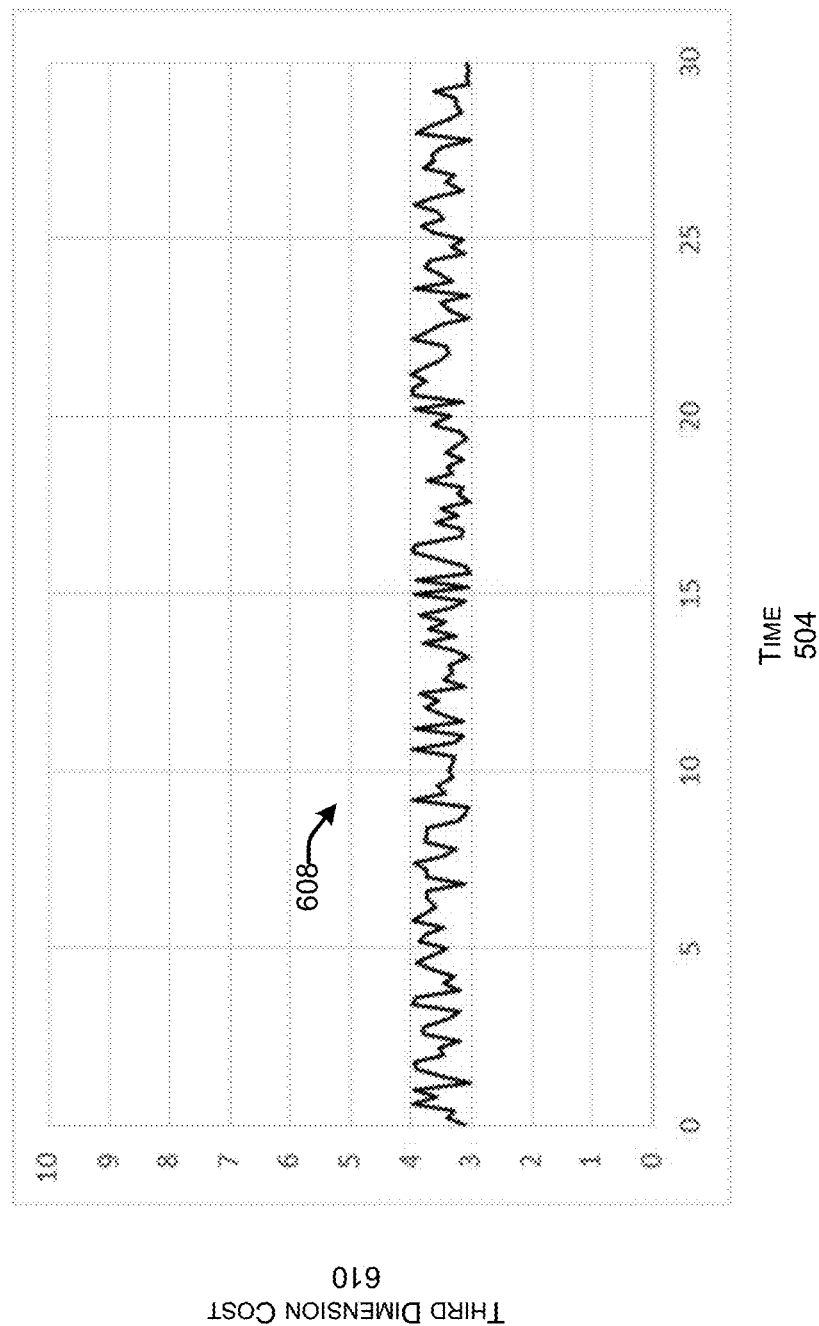

FIGS. 6A to 6C illustrate example dimensional costs associated with the anomalous utilization data 500 described above with reference to FIG. 5. In various implementations, the dimensional costs may be used by a root cause analyzer (e.g., the root cause analyzer 120 described above with reference to FIGS. 1 and 3) to identify one or more root causes of anomalies in the utilization data 500.

FIG. 6A illustrates multiple data points in first dimensional data 600 defined according to a cost in a first dimension 602 accrued by the one or more accounts over time 504. The second anomaly 512 may be attributable to the first dimensional data 600. FIG. 6B illustrates multiple data points in second dimensional data 604 defined according to a cost in a second dimension 606 over time 504. The first anomaly 510 may be attributable to the second dimensional data 604. FIG. 6C illustrates multiple data points in third dimensional data 608 defined according to a cost in a third dimension 610 over time 504. In some cases, the first dimensional data 600 may be analyzed by a first analysis layer (e.g., the first analysis layer 304 described above with reference to FIG. 3), the second dimensional data 604 may be analyzed by a second analysis layer (e.g., the second analysis layer 310 described above with reference to FIG. 3), and the third dimensional data 608 may be analyzed by a third analysis layer. The utilization data 500 described above with reference to FIG. 5 may be a sum of the first dimensional data 600, the second dimensional data 604, and the third dimensional data 608.

In various implementations, the second anomaly 512 may be detected in the utilization data 500 at time=15. The first dimensional data 600 may be input into the first analysis layer. As illustrated in FIG. 6A, the first dimensional data 600 increases significantly at time=15. Accordingly, the first analysis layer may determine a relatively high dimension score (e.g., using Equation 2) representing a high likelihood that the first dimension is a root cause of the second anomaly 512 at time=15 in the utilization data 500.

However, the first anomaly 510 may be detected in the utilization data 500 between time=5 and time=7. Using the first dimensional data 600, the first analysis layer may also determine that a relatively low dimension score representing a low likelihood that the first dimension is a root cause of the first anomaly 510 detected between time=5 and time=7. The first analysis layer may trigger the second analysis layer to perform further root cause analysis.

The second dimensional data 604 may be input into the second analysis layer. As illustrated in FIG. 6B, the second dimensional data 604 spikes between time=5 and time=7. Accordingly, the second analysis layer may determine a relatively high dimension score (e.g., using Equation 2) representing a high likelihood that the second dimension is a root cause of the first anomaly 510 detected between time=5 and time=7. However, the second dimensional cost 602 may be relatively steady at time=15. Accordingly, the second analysis layer may determine a relatively low dimension score representing a low likelihood that the second dimension is a root cause of the second anomaly 512 detected at time=15.

In some cases, the high dimension score indicating that the first dimension is a root cause of the second anomaly 512 at time=15 and/or the high dimension score indicating that the second dimension is a root cause of the first anomaly 510 between time=5 and time=7 may be above a predetermined threshold. In various implementations, in response to determining that the dimension score(s) are above the threshold, the first analysis layer and/or the second analysis layer may refrain from forwarding the utilization data 500 to a subsequent analysis layer.

In various implementations, the third dimensional data 608 may be input into the third dimensional layer. Despite the fact that the third dimensional data 608 is a relatively significant cost in the total cost of the utilization data 500, the third dimensional layer may determine that the third dimensional data 608 is relatively steady during the time intervals at which the anomalies were detected in the utilization data 500. For instance, the third dimensional data 608 is relatively steady during the first anomaly 510 between time=5 and time=7, as well as during the second anomaly 512 after time=15. Accordingly, the third analysis layer may output relatively low dimension scores indicating relatively low likelihoods that the third dimension is a root cause of the anomalies 510 and 512.

Based on the dimension scores generated according to the first dimensional data 600, the second dimensional data 604, and the third dimensional data 608, an aggregator (e.g., the aggregator 308 described above with reference to FIG. 3) may be configured to identify that the first dimension is the root cause of the second anomaly 512 at time=15 and to identify that the second dimension is the root cause of the first anomaly 510 between time=5 and time=7. In some cases, a message indicating the root causes (e.g., the root cause(s) 320 described above with reference to FIG. 3) may be generated and output to an administrator of the account(s). Accordingly, the administrator may identify that unexpected costs can be limited by addressing utilization of the first dimension and/or the second dimension.

Figure 7:
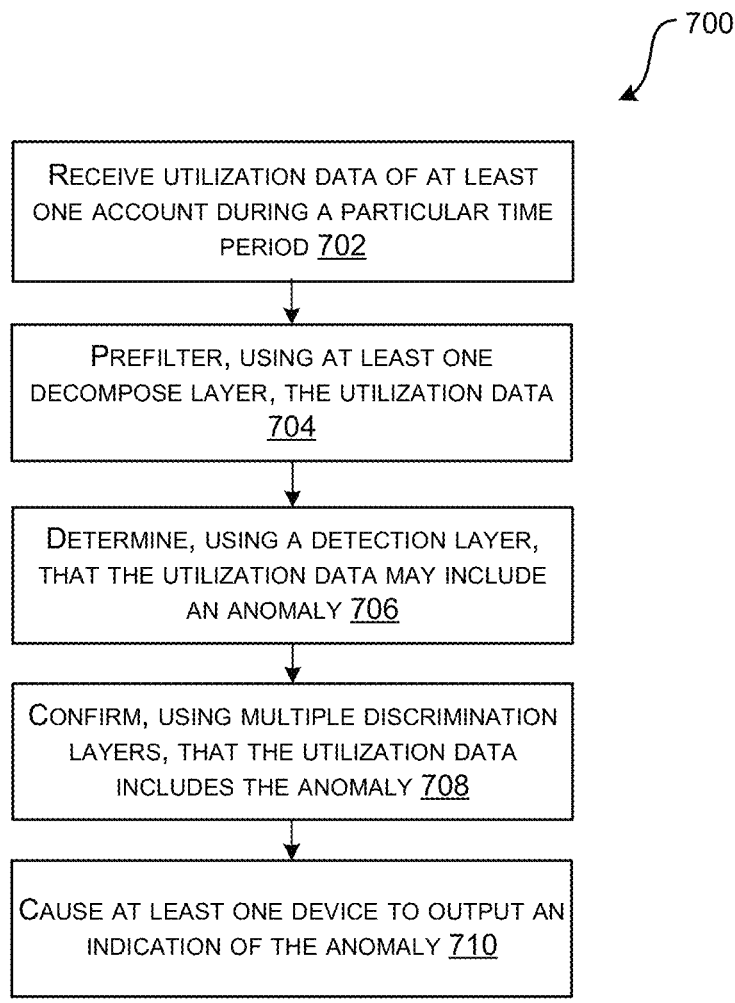
FIG. 7 illustrates an example process for identifying an anomaly in utilization data. Using the process illustrated in FIG. 7, an anomaly can be detected in utilization data of at least one account.

FIG. 7 illustrates an example process 700 for identifying an anomaly in utilization data. In various implementations, the process 700 may be performed by one or more devices including at least one of an anomaly engine (e.g., the anomaly engine 116 described above with reference to FIG. 1), an anomaly detector (e.g., the anomaly detector 118 described above with reference to FIGS. 1 and 2), or the like.

At 702, utilization data is received. The utilization data may include at least one utilization level of at least one account during a particular time period. In some cases, the utilization data may represent utilization levels of multiple accounts in an account family during the particular time period.

In various implementations, the utilization data may include first utilization levels of the account(s) during a first time period, and at least one second utilization level of the account(s) during a second time period. The first time period may occur prior to the second time period. In some cases, the first utilization levels may be non-anomalous.

At 704, the utilization data may be prefiltered using at least one decompose layer. For instance, at least one of a trend component, a seasonality component, and a cycle component may be removed from the utilization data 202 prior to the utilization data. The utilization data may be prefiltered using at least one of LOESS nonlinear smoothing, a moving average convolution filter, or tree-based regression.

At 706, a detection layer may determine that the utilization data includes an anomaly. In some cases, the detection layer may define a range based on the first utilization levels. For instance, the detection layer may determine an average and a standard deviation of the first utilization levels, determine a lower threshold of the range by subtracting a product between a particular z-score and the standard deviation from the average, and determine an upper threshold of the range by adding the product to the average (see, e.g., Formula 1 described above).

In various implementations, the detection layer may identify that the utilization data contains a potential anomaly based on the range. In some examples, the detection layer may determine that the at least one second utilization level is above or below the range. In response to identifying that the at least one second utilization level is outside of the range, the detection layer may determine that the utilization level contains a potential anomaly.

At 708, multiple discrimination layers may confirm that the utilization data includes the anomaly. In various implementations, the multiple discrimination layers may inspect the utilization data in parallel and each generate an anomaly score indicating a likelihood that the utilization data contains an anomaly. In some examples, each anomaly score may be in a range of 0 to 1.

The multiple discrimination layers may include at least one machine learning model. In various implementations, the machine learning model(s) can be trained, based on the first utilization levels, to generate at least one anomaly score corresponding to the second utilization level(s). Some examples of the machine learning model(s) include a random cut forest model, a one-class SVM model, an elliptic envelope model, or the like.

At 710, the process 700 may include causing at least one device to output an indication of the anomaly. For instance, the entity performing the process 700 may transmit, to the device(s), a message indicating the anomaly. In various examples, the device(s) may be associated with an administrator account corresponding to the account(s). Accordingly, an administrator may be able to perform corrective action to prevent the anomaly from persisting.

Figure 8:
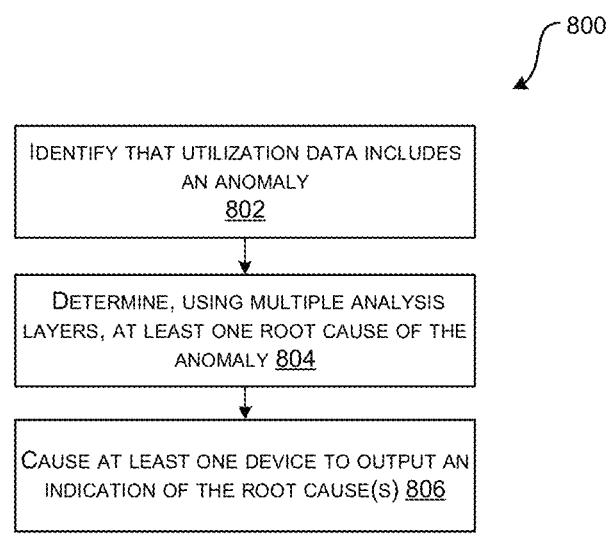
FIG. 8 illustrates an example process for identifying a root cause of an anomaly in utilization data. In various implementations, the process illustrated in FIG. 8 can be performed after the anomaly has been detected in the utilization data. By identifying the root cause, a source of the anomaly can be diagnosed.

FIG. 8 illustrates an example process 800 for identifying a root cause of an anomaly in utilization data. In various implementations, the process 800 may be performed by one or more devices including at least one of an anomaly engine (e.g., the anomaly engine 116 described above with reference to FIG. 1), a root cause analyzer (e.g., the root cause analyzer 120 described above with reference to FIGS. 1 and 3), or the like.

At 802, an anomaly may be identified in utilization data. In various implementations, an indication of the anomaly may be generated by and/or received from an anomaly detector (such as the anomaly detector 118 described above with reference to FIGS. 1 and 2). The utilization data may include at least one utilization level of at least one account during a particular time period. In some cases, the utilization data may represent utilization levels of multiple accounts in an account family during the particular time period.

In various implementations, the utilization data may include first utilization levels of the account(s) during a first time period, and at least one second utilization level of the account(s) during a second time period. The first time period may occur prior to the second time period. In some cases, the first utilization levels may be non-anomalous. According to various implementations, the second utilization level(s) may include the anomaly.

At 804, multiple analysis layers may determine at least one root cause of the anomaly. The analysis layers may inspect the utilization data, one dimension at a time. In various implementations, the second utilization level(s) may include utilization of various computer resources in multiple dimensions, which may correspond to different elements that can affect total utilization by the account(s).

In various implementations, the multiple analysis layers can be arranged in series. For instance, a first analysis layer may receive the utilization data and generate a first dimension score indicating a likelihood that the anomaly in the second utilization level(s) is correlated and/or caused by a first dimension. A second analysis layer may receive the utilization data from the first analysis layer and generate a second dimension score indicating a likelihood that the anomaly is correlated and/or caused by a second dimension. In some examples, the first analysis layer may refrain from forwarding the utilization data to the second analysis layer if the first dimension score is greater than a particular threshold (e.g., 95%). Each analysis layer receiving the utilization data may generate a respective dimension score.

According to various examples, multiple dimension scores generated by the multiple analysis layers may be aggregated in order to determine one or more root causes of the anomaly. In some cases, the one or more dimensions corresponding to the one or more highest dimension scores may be defined as the root cause(s) of the anomaly. In various examples, the one or more dimensions corresponding to the one or more dimension scores above a particular threshold (e.g., 50%) may be defined as the root cause(s) of the anomaly.

At 806, the process 800 may include causing at least one device to output an indication of the root cause(s). For instance, the entity performing the process 800 may transmit, to the device(s), a message indicating the root cause(s). In various examples, the device(s) may be associated with an administrator account corresponding to the account(s). Accordingly, an administrator may be able to perform corrective action on the root cause(s) to prevent the anomaly from persisting.

Figure 9:
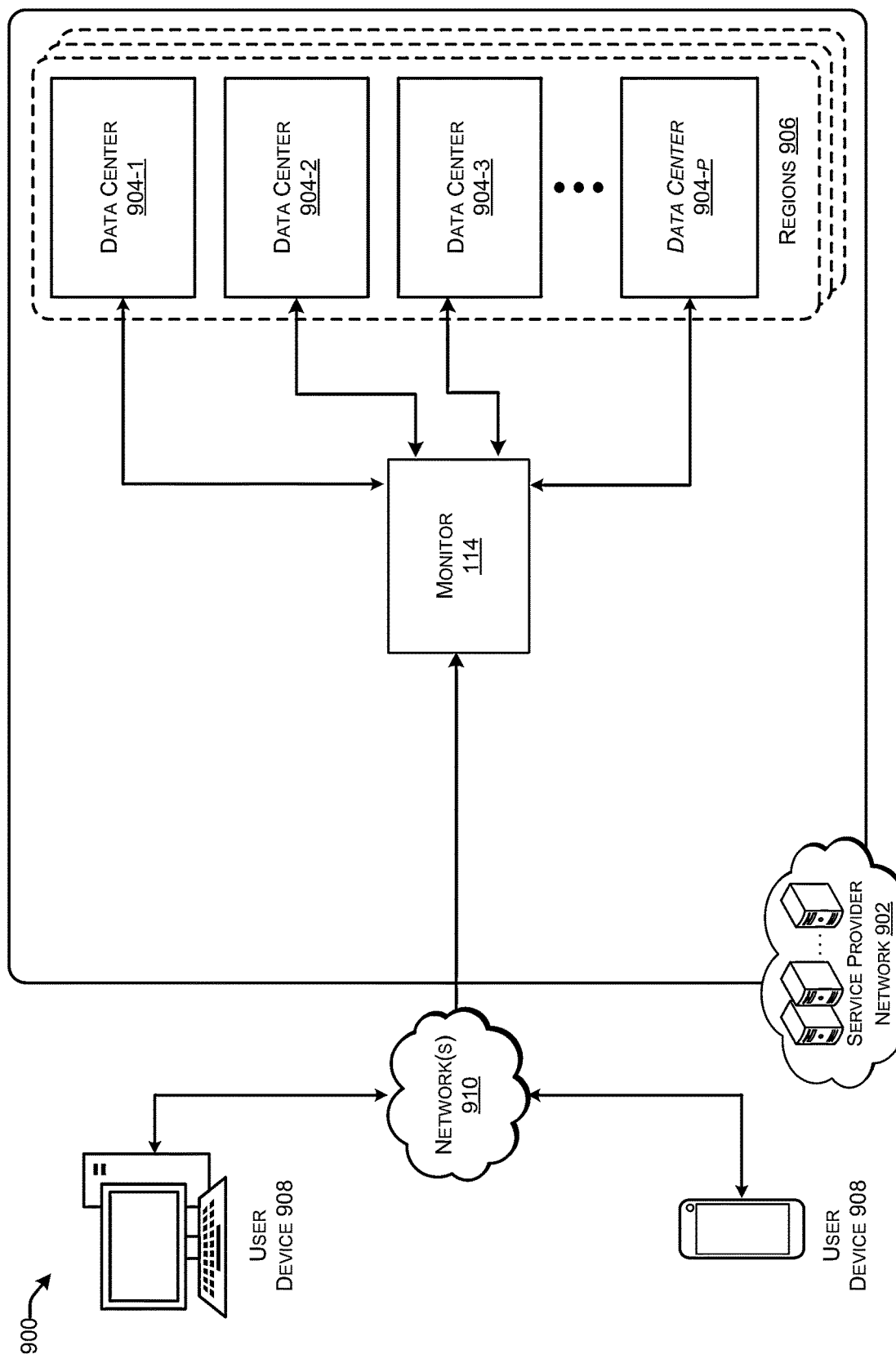
FIG. 9 is a system and network diagram showing an illustrative operating environment that includes a service provider network, which can be configured to implement aspects of various functionalities described herein.

FIG. 9 is a system and network diagram showing an illustrative operating environment 900 that includes a service provider network 902, which can be configured to implement various aspects of various functionalities described herein. The service provider network 902 can provide computing resources, like Virtual Machine (VM) instances and storage, on a permanent or an as-needed basis.

Among other types of functionality, the computing resources provided by the service provider network 902 may be utilized to implement various services described above. For instance, the computing resources provided by the service provider network 902 can include various types of computing resources, such as data processing resources like VM instances, data storage resources, networking resources, data communication resources, network services, and the like. In some cases, the computing resources are provided via bare metal servers within the service provider network 902.

Each type of computing resource provided by the service provider network 902 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service provider network 902 can also be configured to provide other types of computing resources not mentioned specifically herein.

The computing resources provided by the service provider network 902 may be enabled in some implementations by one or more data centers 904-1 to 904-$p$, wherein p is a positive integer. The data center(s) 904-1 to 904-$p$ might be referred to herein singularly as "a data center 904" or in the plural as "the data centers 904"). The data centers 904 are facilities utilized to house and operate computer systems and associated components. The data centers 904 can include redundant and backup power, communications, cooling, and security systems. The data centers 904 can also be located in geographically disparate locations, or regions 906. One region 906 may include multiple availability zones. A region 906 can be defined as a geographical area in which the service provider network 902 clusters data centers 904. Each region 906 can include two or more availability zones connected to one another via a private high-speed network, for example a fiber communication connection. An availability zone can refer to an isolated failure domain including one or more data center facilities with separate power, separate networking, and separate cooling from those in another availability zone. In some cases, availability zones within a region 906 may be positioned far enough away from one other that the same natural disaster should not take more than one availability zone offline at the same time. One illustrative embodiment for a data center 904 that can be utilized to implement the technologies disclosed herein will be described below with regard to FIG. 10.

Various user devices 908 that utilize the service provider network 902 may access the computing resources provided by the service provider network 902 over any wired and/or wireless network(s) 910, which can be a Wide Area Network (WAN), such as the Internet, an intranet or an Internet Service Provider (ISP) network or a combination of such networks. In some examples, without limitation, a user device 908 operated by a client of the service provider network 902 may be utilized to access the service provider network 902 by way of the network(s) 910. It should be appreciated that a Local Area Network (LAN), the Internet, or any other networking topology known in the art that connects the data centers 904 to remote clients and other users can be utilized. It should also be appreciated that combinations of such networks can also be utilized.

In particular implementations, a monitor 114 may be configured to intercept requests from the user device 908 for resources hosted by the data centers 904. The monitor 114 may be configured to generate utilization data based on the intercepted requests. An anomaly engine in the service provider network 902 may be hosted by one or more of the data centers 904. The anomaly engine may receive utilization data from the monitor 114 and detect anomalies in the utilization data and/or diagnose root causes of the anomalies. In various implementations, the anomaly engine may report the anomalies and/or root causes to the user device 908.

In some cases, although not specifically illustrated in FIG. 9, at least a portion of the monitor 114 can be hosted by one or more of the data centers 904. For instance, the monitor 114 may be hosted by one of the data centers 904 in relatively close geographical proximity to the user device 908.

Figure 10:
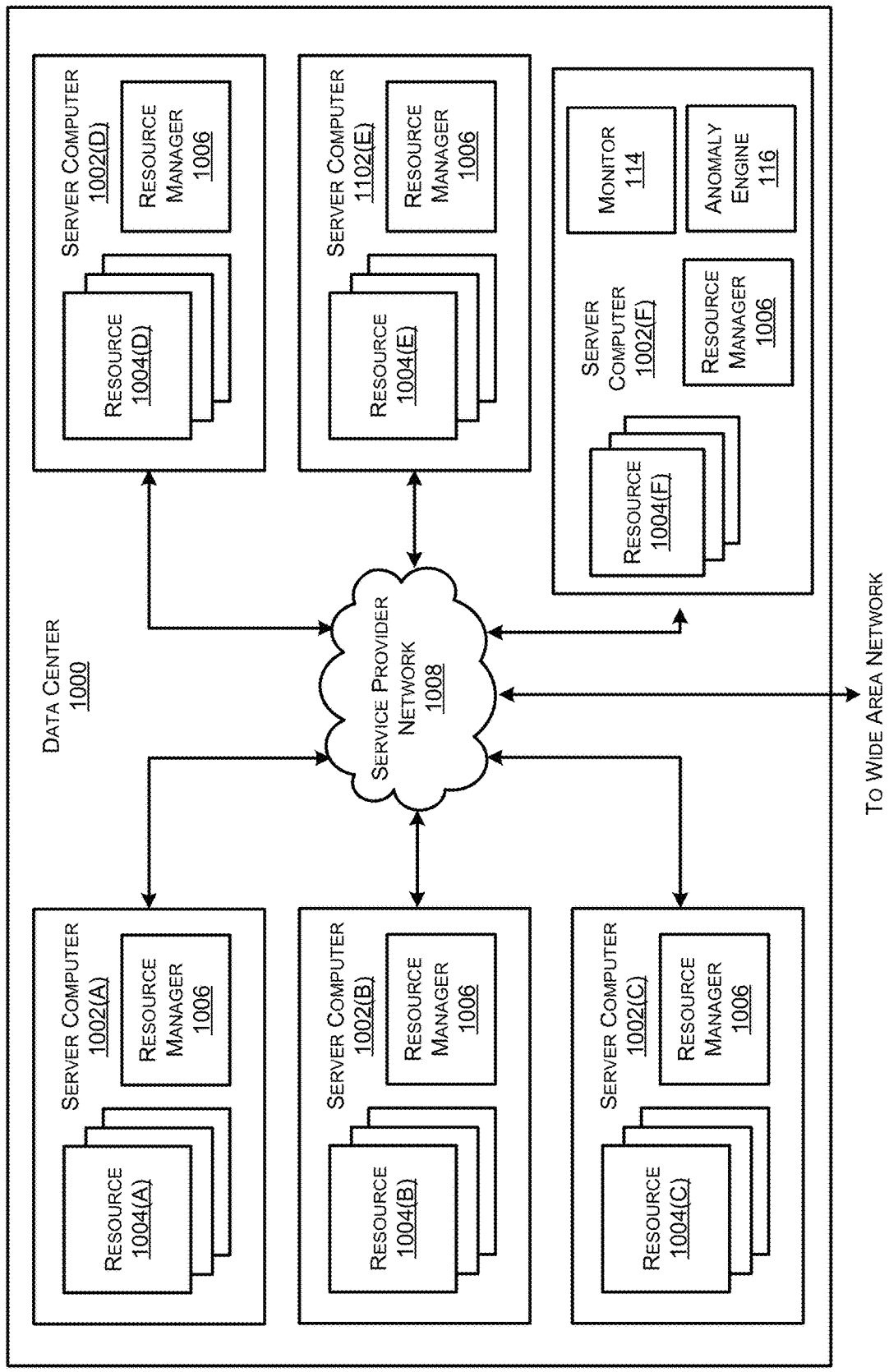
FIG. 10 is a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, be included in, or correspond to, the computing resource network 902 described above with reference to FIG. 9.

The server computers 1002 can be standard tower, rack-mount, or blade server computers configured appropriately for providing the computing resources described herein (illustrated in FIG. 10 as the computing resources 1004A-1004E). As mentioned above, the computing resources provided by the service provider network 1002 can be data processing resources such as Virtual Machine (VM) instances or hardware computing systems, database clusters, computing clusters, storage clusters, data storage resources, database resources, networking resources, and others. Server computers 1002 in the data center 1000 can also be configured to provide network services and other types of services.

Some of the servers 1002 (i.e., server computers 1002A-1002C and 1002F) can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002.

At least one of the servers 1002 (i.e., server computer 1002F) may further execute a monitor 114, which may generate utilization data based on usage levels of various resources 1004 by one or more accounts. The server 1002 may additional execute an anomaly engine 116, which may be configured to identify and/or diagnose anomalies in the utilization data. In some cases, the anomaly engine 116 may generate messages indicating the anomalies and/or root causes of the anomalies. The server 1002 may transmit the messages to external devices, e.g., by transmitting the messages over the service provider network 1008 and a WAN.

In the example data center 1000 shown in FIG. 10, an appropriate service provider network 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904-1 to 904-p (described above with reference to FIG. 9), between each of the server computers 1002A-1002F in the data center 1000, and, potentially, between computing resources in each of the server computers 1002A to 1002C configured to host multiple tenants. It should be appreciated that the configuration of the data center 1000 described with reference to FIG. 10 is merely illustrative and that other implementations can be utilized.

Figure 11:
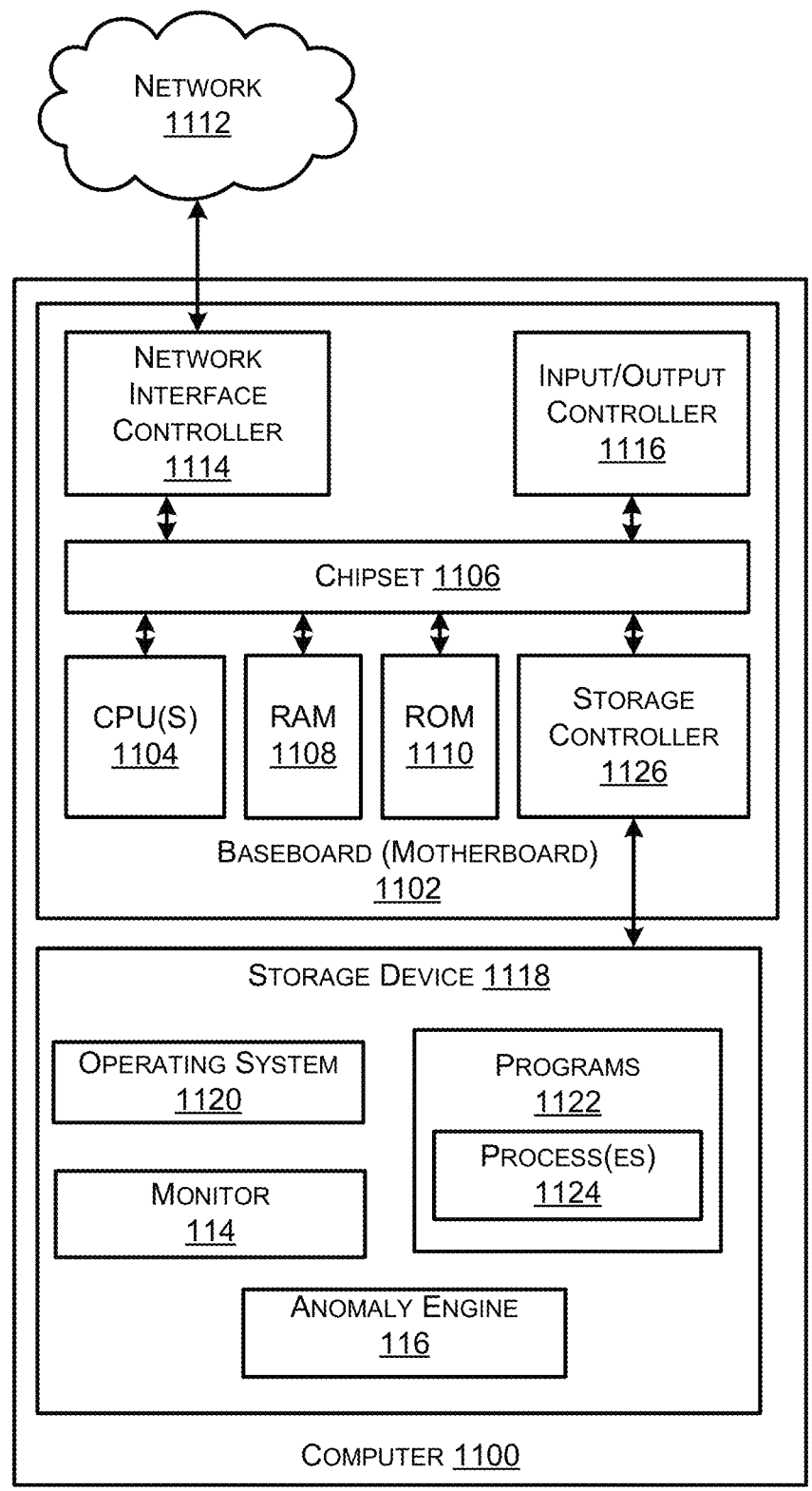
FIG. 11 is a computer architecture diagram showing an illustrative computer hardware architecture for implementing a computing device that can be utilized to implement aspects of the various technologies presented herein.

FIG. 11 is a computer architecture diagram showing an illustrative computer hardware architecture for implementing a computing device that can be utilized to implement aspects of the various technologies presented herein. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more Central Processing Units (CPUs) 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a Read-Only Memory (ROM) 1110 or Non-Volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network 1112. In various implementations, the network 1112 can include at least one of a cloud-based network, a Local Area Network (LAN), or a Wide Area Network (WAN). The chipset 1106 can include functionality for providing network connectivity through a Network Interface Controller (NIC) 1114, such as a gigabit Ethernet adapter. The NIC 1114 is capable of connecting the computer 1100 to other computing devices over the network 1112. It should be appreciated that multiple NICs 1114 can be present in the computer 1100, connecting the computer 1100 to other types of networks and remote computer systems.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device.

The computer 1100 can include and/or be connected to a mass storage device 1118 that provides non-volatile storage for the computer. The mass storage device 1118 can store an operating system 1120, programs 1122 (e.g., processes 1124), as well as the monitor 114, the anomaly engine 116, and data, which have been described in greater detail herein. The mass storage device 1120 can be connected to the computer 1100 through a storage controller 1126 connected to the chipset 1106. The mass storage device 1118 can consist of one or more physical storage units. The storage controller 1126 can interface with the physical storage units through a Serial attached SCSI (SAS) interface, a Serial Advanced Technology Attachment (SATA) interface, a Fiber Channel (FC) interface, or other type of interface for physically connecting and transferring data between computers and physical storage units.

The computer 1100 can store data on the mass storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1118 is characterized as primary or secondary storage, and the like.

For example, the computer 1100 can store information to the mass storage device 1118 by issuing instructions through the storage controller 1126 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 902 described above with reference to FIG. 9, and or any components included therein, may be supported by one or more devices similar to computer 1100. Stated otherwise, some or all of the operations performed by the service provider network 902, and or any components included therein, may be performed by one or more computer devices 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1118 can store an operating system 1120 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1118 can store other system or application programs and data utilized by the computer 1100.

In one embodiment, the mass storage device 1118 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 1 to 8. The computer 1100 can also include computer-readable storage media having instructions stored thereupon for performing any of the other computer-implemented operations described herein.

It will be appreciated that the computer 1100 might not include all of the components shown in FIG. 11, can include other components that are not explicitly shown in FIG. 11, or might utilize an architecture completely different than that shown in FIG. 11.

The environment and individual elements described herein may of course include many other logical, programmatic, and physical components, of which those shown in the accompanying figures are merely examples that are related to the discussion herein.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
   at least one processor; and
   memory storing instructions that, when executed by the at least one processor, cause the at least one processor to perform operations comprising:
      receiving first utilization levels of one or more computing resources by at least one account during a first time period;
      identifying a standard deviation of the first utilization levels;
      identifying an average of the first utilization levels;
      defining a threshold utilization level based on a sum of the average and a product of the standard deviation and a z-score corresponding to a particular confidence level;
      receiving a second utilization level of the one or more computing resources by the at least one account during a second time period that is subsequent to the first time period;
      determining that the second utilization level is equal to or greater than the threshold utilization level;
      in response to determining that the second utilization level is equal to or greater than the threshold utilization level, generating, by multiple discrimination layers applying different anomaly detection models, anomaly scores corresponding to likelihoods that the second utilization level is an anomaly, each one of the multiple discrimination layers generating one of the anomaly scores;
      confirming that the second utilization level is the anomaly by determining that at least half of the anomaly scores meets or exceeds a predetermined threshold;
      in response to confirming that the second utilization level is the anomaly, generating, by multiple analysis layers, dimension scores corresponding to correlations between the anomaly and dimensions of the second utilization level, each one of the multiple analysis layers generating one of the dimension scores;
      determining at least one root cause of the anomaly by identifying at least one of the dimensions corresponding to at least one of the dimension scores that meets or exceeds a threshold correlation; and
      causing a user device associated with the least one account to output an indication of the anomaly and the at least one root cause.

2. The system of claim 1, wherein the anomaly scores comprise a first anomaly score, a second anomaly score, a third anomaly score, and a fourth anomaly score,
   wherein the likelihoods comprise a first likelihood, a second likelihood, a third likelihood, and a fourth likelihood, and
   wherein generating the anomaly scores comprises:
      determining, by analyzing the second utilization level using a standard deviation-based discrimination layer among the multiple discrimination layers, the first anomaly score corresponding to the first likelihood that the second utilization level is the anomaly;

determining, by analyzing the second utilization level using a random cut forest discrimination layer among the multiple discrimination layers, the second anomaly score corresponding to the second likelihood that the second utilization level is the anomaly;

determining, by analyzing the second utilization level using a one-class Support Vector Machine (SVM) discrimination layer among the multiple discrimination layers, the third anomaly score corresponding to the third likelihood that the second utilization level is the anomaly; and determining, by analyzing the second utilization level using an elliptic envelope discrimination layer among the multiple discrimination layers, the fourth anomaly score corresponding to the fourth likelihood that the second utilization level is the anomaly.

3. The system of claim 1, wherein the dimensions comprise a first dimension and a second dimension, wherein the dimension scores comprise a first dimension score and a second dimension score, wherein the correlations comprise a first correlation and a second correlation, and wherein generating the dimension scores comprises:
determining, using a first analysis layer among the multiple analysis layers, the first dimension score indicating the first correlation between the anomaly and the first dimension; and determining, using a second analysis layer among the multiple analysis layers, the second dimension score indicating the second correlation between the anomaly and the second dimension.

4. The system of claim 3, wherein the at least one account comprises an account family comprising multiple related accounts, the at least one root cause comprises one or more actions performed by a linked account among the multiple related accounts in the account family, and the operations further comprise:

suspending the linked account from increasing usage of the one or more computing resources by the account family.

5. A method, comprising:
receiving at least one utilization level of one or more computer resources by an account during a time interval;

determining a first potential anomaly and a second potential anomaly associated with the at least one utilization level;

determining a first likelihood that the first potential anomaly is an anomaly in the at least one utilization level and a second likelihood that the second potential anomaly is the anomaly in the at least one utilization level;

determining, based at least in part on at least one of the first likelihood or the second likelihood, the anomaly in the at least one utilization level;

in response to determining the anomaly, determining a dimension score based at least in part on the anomaly and a particular dimension of the at least one utilization level, the at least one utilization level comprising multiple dimensions including the particular dimension;

determining that the particular dimension is a root cause of the anomaly based at least in part on the dimension score; and in response to determining at least one of that the at least one utilization level comprises the anomaly or that the particular dimension is the root cause of the anomaly, performing an action associated with the account.

6. The method of claim 5, wherein determining that the at least one utilization level comprises the anomaly includes determining that a threshold number of multiple discrimination layers identify that the at least one utilization level comprises the anomaly, and wherein the at least one utilization level is at least one first utilization level and the time interval is a first time interval, the method further comprising:

receiving multiple second utilization levels of the one or more computer resources by the account during a second time interval, the second time interval being prior to the first time interval;

determining an average of the multiple second utilization levels;

determining a standard deviation of the multiple second utilization levels; and defining an upper threshold of a predetermined range associated with the account as a sum of the average and a product of a predetermined z-score and the standard deviation.

7. The method of claim 6, wherein determining that the threshold number of the multiple discrimination layers identify that the at least one first utilization level comprises the anomaly comprises:

identifying, using a standard deviation-based discrimination layer among the multiple discrimination layers, an anomaly score indicating a third likelihood that the at least one first utilization level comprises the anomaly based at least in part on the average and the standard deviation;

determining that the anomaly score is equal to or greater than a threshold score; and in response to determining that the anomaly score is equal to or greater than the threshold score, determining that the standard deviation-based discrimination layer identifies that the at least one first utilization level comprises the anomaly.

8. The method of claim 6, further comprising:
training a random cut forest discrimination layer among the multiple discrimination layers based at least in part on the multiple second utilization levels, wherein determining that the threshold number of the multiple discrimination layers identifies that the at least one first utilization level comprises the anomaly comprises:

identifying, using the random cut forest discrimination layer, an anomaly score indicating a third likelihood that the at least one first utilization level comprises the anomaly;

determining that the anomaly score is equal to or greater than a threshold score; and in response to determining that the anomaly score is equal to or greater than the threshold score, determining that the random cut forest discrimination layer identifies that the at least one first utilization level comprises the anomaly.

9. The method of claim 6, further comprising:
training a one-class Support Vector Machine (SVM) discrimination layer among the multiple discrimination layers based at least in part on the multiple second utilization levels, wherein determining that the threshold number of the multiple discrimination layers identifies that the at least one first utilization level comprises the anomaly comprises:

identifying, using the one-class SVM discrimination layer, an anomaly score indicating a third likelihood that the at least one first utilization level comprises the anomaly;

determining that the anomaly score is equal to or greater than a threshold score; and in response to determining that the anomaly score is equal to or greater than the threshold score, determining that the one-class SVM discrimination layer identifies that the at least one first utilization level comprises the anomaly.

10. The method of claim 6, further comprising:

training an elliptic envelope discrimination layer among the multiple discrimination layers based at least in part on the multiple second utilization levels, wherein determining that the threshold number of the multiple discrimination layers identifies that the at least one first utilization level comprises the anomaly comprises:

identifying, using the elliptic envelope discrimination layer, an anomaly score indicating a third likelihood that the at least one first utilization level comprises the anomaly;

determining that the anomaly score is equal to or greater than a threshold score; and in response to determining that the anomaly score is equal to or greater than the threshold score, determining that the elliptic envelope discrimination layer identifies that the at least one first utilization level comprises the anomaly.

11. The method of claim 5, further comprising:

determining a second dimension score based at least in part on a first correlation between a second dimension among the multiple dimensions and the anomaly;

determining that the second dimension score is below a threshold score;

in response to determining that the second dimension score is below the threshold score, determining the dimension score based at least in part on a second correlation between the particular dimension and the anomaly;

determining that the dimension score is equal to or greater than the threshold score;

in response to determining that the dimension score is equal to or greater than the threshold score, defining the particular dimension as the root cause of the anomaly; and causing a user device to output a message indicating the root cause of the anomaly.

12. The method of claim 11, wherein the account comprises an account family comprising multiple accounts, the root cause comprises one or more actions performed by a linked account among the multiple accounts in the account family, and the method further comprises:

suspending the linked account from increasing usage of the one or more computer resources by the account family.

13. A system, comprising:

at least one processor; and memory storing instructions that, when executed by the at least one processor, cause the at least one processor to perform operations comprising:

receiving one or more utilization levels of one or more computer resources by an account during a time interval;

determining a first potential anomaly and a second potential anomaly associated with the one or more utilization levels;

determining a first likelihood that the first potential anomaly is an anomaly in the one or more utilization levels and a second likelihood that the second potential anomaly is the anomaly in the one or more utilization levels;

detecting, based at least in part on at least one of the first likelihood or the second likelihood, the anomaly in the one or more utilization levels;

in response to detecting the anomaly, determining a dimension score based at least in part on a correlation between the anomaly and a particular dimension of the one or more utilization levels, the one or more utilization levels comprising multiple dimensions including the particular dimension;

determining that the particular dimension is a root cause of the anomaly based at least in part on the dimension score; and in response to determining that the particular dimension is the root cause of the anomaly, performing an action associated with the account.

14. The system of claim 13, wherein detecting the anomaly in the one or more utilization levels comprises:

determining that at least one utilization level among the one or more utilization levels is outside of a predetermined range; and in response to determining that the at least one utilization level is outside of the predetermined range, determining that a threshold number of multiple discrimination layers identify the anomaly in the at least one utilization level.

15. The system of claim 14, wherein the multiple discrimination layers comprise at least one of a random cut forest model, a one-class SVM discrimination model, or an elliptic envelope discrimination model.

16. The system of claim 14, wherein the one or more utilization levels are one or more first utilization levels and the time interval is a first time interval, the operations further comprising:

receiving one or more second utilization levels of the one or more computer resources by the account during a second time interval, the second time interval being prior to the first time interval;

determining an average of the one or more second utilization levels;

determining a standard deviation of the one or more second utilization levels; and determining the predetermined range based at least in part on the average and the standard deviation.

17. The system of claim 16, the operations further comprising:

training at least one machine learning model to detect the anomaly based at least in part on the second utilization levels.

18. The system of claim 13, wherein the dimension score is a first dimension score and the particular dimension is a first dimension, the operations further comprising:

determining a second dimension score based at least in part on a second correlation between the anomaly and a second dimension of the one or more utilization levels; and determining that the second dimension score is below a threshold score, wherein determining the first dimension score is in response to determining that the second dimension score is below the threshold score.

19. The system of claim 13, wherein performing the action comprises causing a user device associated with the account to output an indication of the root cause.

20. The system of claim 13, wherein the account comprises an account family comprising multiple related accounts, the root cause comprises one or more actions performed by a linked account among the multiple related accounts in the account family, and wherein performing the action comprises suspending the linked account from increasing usage of the one or more computer resources by the account family.

\* \* \* \* \*